United States Patent [19]
Matsumoto et al.

[11] Patent Number: 5,732,552
[45] Date of Patent: Mar. 31, 1998

[54] APPARATUS FOR DETERIORATION DIAGNOSIS OF AN EXHAUST PURIFYING CATALYST

[75] Inventors: Takuya Matsumoto; Toru Hashimoto; Mitsuhiro Miyake, all of Kyoto; Toshiro Nomura; Hidetsugu Kanao, both of Okazaki, all of Japan

[73] Assignee: Mitsubishi Jidosha Kogyo Kabushiki Kaisha, Tokyo, Japan

[21] Appl. No.: 599,314

[22] Filed: Feb. 9, 1996

[30] Foreign Application Priority Data

Feb. 10, 1995 [JP] Japan ................................. 7-023181
Feb. 10, 1995 [JP] Japan ................................. 7-023182

[51] Int. Cl.⁶ .......................................... F01N 3/20
[52] U.S. Cl. ........................... 60/276; 60/277; 60/285
[58] Field of Search ............................ 60/276, 277, 285

[56] References Cited

U.S. PATENT DOCUMENTS

| | | | |
|---|---|---|---|
| 5,228,287 | 7/1993 | Kuronishi | 60/276 |
| 5,337,558 | 8/1994 | Komatsu | 60/276 |
| 5,341,642 | 8/1994 | Kurihara et al. | 60/276 |
| 5,400,592 | 3/1995 | Mukaihira et al. | 60/276 |

FOREIGN PATENT DOCUMENTS

| | | |
|---|---|---|
| 4243339 | 6/1993 | Germany . |
| 4404449 | 9/1994 | Germany . |
| 4412191 | 10/1994 | Germany . |

*Primary Examiner*—Douglas Hart

[57] ABSTRACT

A deterioration diagnostic apparatus for a three-way catalyst includes an electronic control unit, which obtains a frequency of reversals of the changing direction in which the output of an upstream-side $O_2$ sensor changes, based on the number of times the output voltage of the $O_2$ sensor crosses a threshold. Also, the control unit obtains a frequency of reversals of the changing direction in which the output of a downstream-side $O_2$ sensor changes, based on the number of times the output voltage of the downstream-side $O_2$ sensor crosses upper and lower reversal reference values which are obtained by adding and subtracting a hysteresis constant to and from an average value of input values of the downstream-side $O_2$ sensor output voltage. The control unit further obtains the ratio of the reversal frequency of the downstream-side sensor output to the reversal frequency of the upstream-side sensor output, and diagnoses deterioration of the three-way catalyst when the reversal frequency ratio has become greater than a predetermined value.

19 Claims, 13 Drawing Sheets

F I G. 10
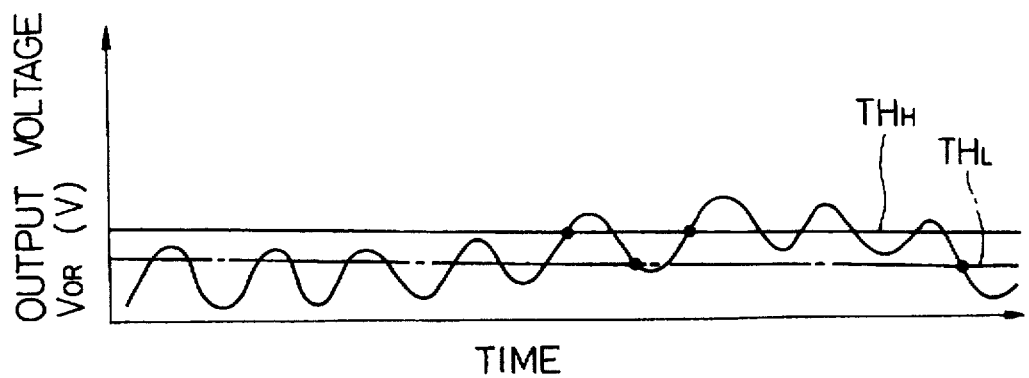

APPARATUS FOR DETERIORATION DIAGNOSIS OF AN EXHAUST PURIFYING CATALYST

BACKGROUND OF THE INVENTION

1. Field of the Invention

The present invention relates to an apparatus for deterioration diagnosis of an exhaust purifying catalyst, and more particularly, to an apparatus for diagnosing deterioration of an exhaust purifying catalyst based on an output signal from an air-fuel ratio sensor arranged on a downstream side of the exhaust purifying catalyst or output signals from air-fuel ratio sensors arranged on upstream and downstream sides, respectively, of the catalyst.

2. Description of the Related Art

There has been known to arrange an exhaust purifying catalyst, for example, a three-way catalyst, in an exhaust system of an automotive gasoline engine in order to reduce the amount of emission of harmful gas to the atmosphere. The three-way catalyst oxidizes hydrocarbon (HC) and carbon monoxide (CO), and also deoxidizes nitrogen oxides ($NO_x$), thereby purifying the exhaust gas. The oxidization and deoxidization by the three-way catalyst, however, take place sufficiently only in a narrow air-fuel ratio region (window) near the stoichiometric air-fuel ratio. Therefore, the air-fuel ratio is subjected to feedback control so as to be close to the stoichiometric air-fuel ratio in accordance with the output signal of an air-fuel ratio sensor oxygen concentration sensor (hereinafter referred to as $O_2$ sensor)) arranged in an exhaust manifold, to thereby make the most of the purifying capacity of the three-way catalyst. However, the three-way catalyst deteriorates with use and its purification efficiency lowers. Generally, therefore, the degree of deterioration of the three-way catalyst is checked using an exhaust gas tester at the time of periodic inspection. If the interval between inspections is long, however, there is a possibility that a three-way catalyst which has lowered in purification efficiency is continuously used for a long period of time.

In view of this, it is known to diagnose such deterioration of the three-way catalyst by means of a diagnostic apparatus. For example, Unexamined Japanese Patent Publication No. 61-286550 discloses a deterioration diagnostic apparatus for determining deterioration of a three-way catalyst on the basis of the output signals from two $O_2$ sensors arranged on upstream and downstream sides, respectively, of the three-way catalyst. This deterioration diagnostic apparatus utilizes the short-period fluctuation of the air-fuel ratio near a target air-fuel ratio (e.g., stoichiometric air-fuel ratio) observed during air-fuel ratio feedback control, and the determination as to whether the three-way catalyst is deteriorated or not is made by comparing the frequency of reversals of the output signal of the upstream-side $O_2$ sensor, which varies with fluctuation of the air-fuel ratio, with the reversal frequency of the output signal of the downstream-side $O_2$ sensor. As is conventionally known, the output signal of an $O_2$ sensor greatly varies depending on whether the air-fuel ratio is smaller (richer) or greater (leaner) than the stoichiometric air-fuel ratio, and therefore, the direction of change of the sensor output signal is reversed (hereinafter merely referred to as reversal of the sensor output) each time the air-fuel ratio changes from rich to lean side or vice versa.

A normal three-way catalyst has a capability to store the residual oxygen in the exhaust gas, and thus the exhaust gas which has passed through a normal three-way catalyst contains only a small amount of oxygen. Consequently, the output signal of the downstream-side $O_2$ sensor shows small fluctuation, as indicated by the dashed curve in FIG. 9. Namely, the amplitude of the sensor output signal is small, and also the frequency of reversals of the sensor output signal is very low. On the other hand, the output signal of the upstream-side $O_2$ sensor fluctuates with fluctuation in the air-fuel ratio, and its frequency of reversals is significantly high as compared with that of the downstream-side $O_2$ sensor, as indicated by the solid line in FIG. 9, because it is in agreement with the fluctuation of the air-fuel ratio. Accordingly, during the air-fuel ratio feedback control, the ratio of the reversal frequency of the downstream-side $O_2$ sensor output to that of the upstream-side $O_2$ sensor output takes a very small value insofar as the three-way catalyst is normal.

If, however, the three-way catalyst deteriorates and its oxygen storage capability lowers, the residual oxygen in the exhaust gas cannot be stored in the three-way catalyst but passes therethrough. In this case, the output signal of the downstream-side $O_2$ sensor fluctuates with fluctuation in the air-fuel ratio, like the output signal of the upstream-side $O_2$ sensor; therefore, the reversal frequency of the downstream-side sensor output increases. In other words, the aforementioned reversal frequency ratio gradually approaches the value "1" as the three-way catalyst deteriorates. Thus, in the deterioration diagnostic apparatus mentioned above, the determination as to deterioration of the three-way catalyst is made based on the relationship between the purification efficiency of the three-way catalyst and the reversal frequency ratio.

In some cases, however, the above conventional deterioration diagnostic apparatus fails to make a correct determination. One of the reasons is that although the reversal frequency ratio of the two $O_2$ sensor outputs varies depending not only on the degree of deterioration of the three-way catalyst but also on the operating state of the engine, the conventional apparatus uses a fixed reversal reference value for determining deterioration of the three-way catalyst.

Deterioration diagnostic apparatuses include a type which makes use of a hysteresis characteristic (see FIG. 10) in detecting the reversal of the output signal of an air-fuel ratio sensor. In FIG. 10, symbol $TH_H$ represents an upper reversal reference value corresponding to a sensor output voltage observed when an actual air-fuel ratio is slightly richer than the stoichiometric air-fuel ratio, and $TH_L$ represents a lower reversal reference value corresponding to a sensor output voltage observed when an actual air-fuel ratio is slightly leaner than the stoichiometric air-fuel ratio. While the sensor output voltage is rising, a reversal of the sensor output signal is detected when the sensor output voltage exceeds the upper reversal reference value $TH_H$, and while the sensor output voltage is lowering, a reversal of the sensor output signal is detected when the sensor output voltage decreases below the lower reversal reference value $TH_L$.

In cases where the deterioration of the three-way catalyst has not progressed so much, the output voltage level of the downstream-side $O_2$ sensor shifts from rich to lean side and vice versa at relatively long intervals with lapse of time, as shown in FIG. 10. When the sensor output voltage level shifts in this manner, it may start to decrease before exceeding the reversal reference value $TH_H$ or may start to increase before dropping below the reversal reference value $TH_L$. In such cases, the number of times the sensor output varies across the reversal reference value $TH_H$ or $TH_L$ decreases, with the result that the count of the reversal frequency of the sensor output becomes smaller than an actual value. In the case illustrated in FIG. 10, although the sensor output is actually reversed 16 times, the reversal of the sensor output is detected only at four reversal detection points indicated by the mark ".". That is, the reversal of the sensor output is detected only four times. Thus, if the number of times the reversal of the sensor output is detected is much smaller than an actual number, the aforementioned reversal frequency ratio does not become greater than the reversal reference value even though the three-way catalyst has deteriorated, resulting in an erroneous determination by the deterioration diagnostic apparatus that the three-way catalyst is normal.

The output voltage level of an $O_2$ sensor shifts at long intervals as mentioned above. In addition, the shift intervals and amplitude of the sensor output voltage vary depending on individual engines and the operating state of the engine, auxiliary machinery or the like, which entails a wide variation in proper reversal reference value for determining deterioration of the catalyst.

As described above, the output signal of the $O_2$ sensor (air-fuel ratio sensor), and thus the reversal frequency ratio of the two sensor outputs, fluctuates due to various factors; therefore, it is difficult to fix the reversal reference value for determining deterioration of the three-way catalyst (exhaust purifying catalyst) at a certain proper value.

If the reversal reference value is much higher than the proper value, deterioration of the three-way catalyst is detected later than an appropriate time, making the emission of harmful gas unavoidable. On the other hand, if the reversal reference value is set at a lower value in order to eliminate the delay in determining deterioration of the three-way catalyst, then deterioration of the catalyst is diagnosed at an early time. That is, there is a possibility that the three-way catalyst is judged to be deteriorated though its purification efficiency is still within an allowable range. As is conventionally known, the three-way catalyst is a very expensive component using noble metal such as platinum, and the repair and replacement of the three-way catalyst consume labor. Therefore, if the repair or replacement of the three-way catalyst is performed much earlier than necessary due to improper deterioration determination, the requirements for saving resources and reducing the running cost cannot be fulfilled.

Another reason why the degree of deterioration of the catalyst cannot be properly determined by the conventional apparatus will be explained.

The frequency of reversals of the upstream-side $O_2$ sensor output is high in a high-speed, high-load operating region in which the amount of intake air is large, and is low in a low-speed, low-load operating region in which the amount of intake air is small. On the other hand, the reversal frequency of the downstream-side $O_2$ sensor output undergoes smaller change than that of the upstream-side $O_2$ sensor output. Therefore, there arises a large difference of the reversal frequency ratio between a vehicle which is chiefly used in an urban congested area and a vehicle which is chiefly used for continuous high-speed travel on expressways, for example. Accordingly, if the value for determining deterioration of the catalyst is set at a fixed value without regard to the operating region of the internal combustion engine, deterioration of the three-way catalyst is detected at different times for such vehicles used in different ways, that is, a vehicle used mostly for travel in a congested area and a vehicle used mostly for continuous high-speed travel, even though the deteriorations of the catalysts are of the same level.

More generally, in cases where the engine is operated frequently in a specific operating region, it is difficult to correctly determine the degree of deterioration of the three-way catalyst on the basis of the reversal frequency ratio, by means of the aforementioned conventional apparatus using the discriminating value which is set at a fixed value without regard to the operating region.

SUMMARY OF THE INVENTION

An object of the present invention is to provide a deterioration diagnostic apparatus which can make an accurate determination as to whether an exhaust purifying catalyst is deteriorated or not by eliminating the influence of error factors upon the determination as to deterioration of the catalyst.

Another object of the present invention is to provide a deterioration diagnostic apparatus which can determine with high accuracy whether the exhaust purifying catalyst is deteriorated or not even when the output level of a downstream-side air-fuel ratio sensor shifts to rich or lean side.

Still another object of the present invention is to provide a deterioration diagnostic apparatus which can determine with high accuracy whether the exhaust purifying catalyst is deteriorated or not even in the case where an internal combustion engine is frequently operated in a specific operating region.

An apparatus for making a deterioration diagnosis of an exhaust purifying catalyst according to the present invention comprises a downstream-side air-fuel ratio sensor arranged in an exhaust passage of an internal combustion engine on a downstream side of the exhaust purifying catalyst; reference value setting means for variably setting a reversal reference value in accordance with an output signal of the downstream-side air-fuel ratio sensor; and deterioration determining means for determining presence of deterioration of the exhaust purifying catalyst, based on the number of times the output signal of the downstream-side air-fuel ratio sensor has crossed the reversal reference value set by the reference value setting means.

The present invention is advantageous in that, since the reversal reference value for determining the catalyst deterioration is variably set in accordance with the output signal of the air-fuel ratio sensor, adverse influences of various error factors upon the catalyst deterioration determination are eliminated, and therefore, the presence/absence of deterioration of the exhaust purifying catalyst can be diagnosed with accuracy. For example, when the sensor output signal level is shifted toward fuel-rich or fuel-lean side, the reversal reference value is renewed to follow the shift. Thus, even if the sensor output level shifts, the reversal reference value takes a proper value at all times. As a result, an actual number of reversals of the changing direction in which the sensor output signal changes is accurately detected, improving the accuracy in the catalyst deterioration determination which is made based on the detected number of reversals. Thus, a judgment that the exhaust purifying catalyst is deteriorated can be made at a proper time, and the need for repair or replacement of the exhaust purifying catalyst can be notified at an appropriate time. It is, therefore, possible to avoid the exhaust purifying catalyst being repaired or replaced uselessly in the case where the catalyst deterioration is diagnosed too early, as well as to avoid harmful gas being emitted in the case where the catalyst deterioration is diagnosed too late.

Preferably, the reference value setting means includes an average value computing means for calculating an average value of input values of an output signal of the downstream-side air-fuel ratio sensor, and variably sets the reversal reference value in accordance with the average value calculated by the average value computing means. In this case, the average value of sensor output signal values reflecting the output signal level of the downstream-side air-fuel ratio sensor is calculated, and the reversal reference value is variably set in accordance with the calculated average value. Accordingly, the reversal reference value is renewed so as to follow a level shift of the sensor output signal or a change in the operating state of the internal combustion engine, for example. It is, therefore, possible to accurately determine the presence/absence of deterioration of the exhaust purifying catalyst, regardless of a level shift of the sensor output signal or the operating state of the internal combustion engine.

The average value computing means preferably calculates the average value of input values of the output signal of the downstream-side air-fuel ratio sensor according to the equation $$O_{2ave} = a \times O_{2ave(n-1)} + (1-a) \times O_{2real}$$

where $O_{2ave}$ is the average value of input values of the output signal of the downstream-side air-fuel ratio sensor, $O_{2ave(n-1)}$ is an average value calculated in a preceding cycle, $O_{2real}$ is an input value of a present output signal of the downstream-side air-fuel ratio sensor, and a is a filter constant. In this case, by suitably setting the filter constant a, it is possible to adjust the follow-up change rate (response) of the average value of air-fuel ratio sensor output signal values with respect to a level shift of the sensor output signal, for example, and thus to adjust the follow-up change rate of the reversal reference value. Therefore, even in the case where the sensor output level is shifted, catalyst deterioration can be determined with accuracy by using a proper reversal reference value. Moreover, by suitably adjusting the response of the reversal reference value with respect to a level shift of the sensor output signal, a course of engine operation or a location of the downstream-side air-fuel ratio sensor relative to the exhaust purifying catalyst can be appropriately reflected in the determination as to catalyst deterioration, thus permitting proper catalyst deterioration determination.

Preferably, the deterioration determining means includes first reversal frequency detecting means for detecting a frequency of reversals of a changing direction in which the output signal of the downstream-side air-fuel ratio sensor changes, based on the number of times the output signal of the downstream-side air-fuel ratio sensor has crossed the reversal reference value set by the reference value setting means. Based on the reversal frequency associated with the output signal of the downstream-side air-fuel ratio sensor detected by the first reversal frequency detecting means, the deterioration determining means determines deterioration of the exhaust purifying catalyst. In this case, the deterioration determination can be quantitatively made based on the reversal frequency reflecting the degree of deterioration of the exhaust purifying catalyst, thus further improving the accuracy in the deterioration determination.

More preferably, the deterioration diagnostic apparatus includes an upstream-side air-fuel ratio sensor arranged in the exhaust passage on an upstream side of the exhaust purifying catalyst. The deterioration determining means includes second reversal frequency detecting means for detecting a frequency of reversals of a changing direction in which the output signal of the upstream-side air-fuel ratio sensor changes, and deterioration information quantity computing means for computing a quantity of catalyst deterioration information based on the reversal frequency of the changing direction of the output signal of the downstream-side air-fuel ratio sensor, which frequency is detected by the first reversal frequency detecting means, and the reversal frequency of the changing direction of the output signal of the upstream-side air-fuel ratio sensor, which frequency is detected by the second reversal frequency detecting means. The deterioration determining means determines whether the exhaust purifying catalyst is deteriorated or not based on the catalyst deterioration information quantity computed by the deterioration information quantity computing means. In this case, the reversal frequency of the upstream-side air-fuel ratio sensor output corresponds to actual fluctuation in the air-fuel ratio, and the reversal frequency of the downstream-side air-fuel ratio sensor output varies in accordance with the degree of deterioration of the catalyst. Accordingly, the determination as to deterioration of the catalyst can be made directly and quantitatively based on the quantity of catalyst deterioration information calculated based on the reversal frequencies of the two sensor outputs and reflecting the operating state of the internal combustion engine, thus permitting even more accurate deterioration determination.

Still preferably, the deterioration diagnostic apparatus further comprises operating state detecting means for detecting an operating state of the internal combustion engine, and operating region determining means for determining to which of preset plural operating regions the operating state detected by the operating state detecting means belongs. The deterioration information quantity computing means sequentially computes catalyst deterioration information quantities for at least two operating regions sequentially determined by the operating region determining means. Based on the catalyst deterioration information quantities computed by the deterioration information quantity computing means with respect to the at least two operating regions, respectively, the deterioration determining means makes a determination as to deterioration of the exhaust purifying catalyst. In this case, whether the exhaust purifying catalyst is deteriorated or not is determined based on the catalyst deterioration information quantities (e.g., an average value of these deterioration information quantities) associated with at least two operating regions, respectively, making it possible to eliminate inaccurate determination which is caused when the deterioration determination is made based solely on the catalyst deterioration information quantity associated with one operating region.

Alternatively, the deterioration information quantity computing means computes a quantity of catalyst deterioration information associated with the operating region determined by the operating region determining means. The deterioration determining means makes a determination as to deterioration of the exhaust purifying catalyst based on the catalyst deterioration information quantity computed by the deterioration information quantity computing means with respect to the operating region determined by the operating region determining means, and a predetermined discriminating value corresponding to the operating region determined by the operating region determining means. In this case, the determination as to deterioration of the catalyst is made based on the discriminating value uniquely set for each of the operating regions of the internal combustion engine, thus making it possible to eliminate inaccurate determination which is caused when the deterioration determination is made based on a single discriminating value set in common for all operating regions. Further, when the operating state of the internal combustion engine has changed, the deterioration discriminating value is updated correspondingly, whereby high-accuracy deterioration determination can be made even in cases where the internal combustion engine is frequently operated in a specific operating state.

The deterioration diagnostic apparatus according to the preferred embodiment including the upstream- and downstream-side air-fuel ratio sensors is preferably used with an internal combustion engine having air-fuel ratio control means for feedback-controlling the air-fuel ratio of a mixture supplied to the internal combustion engine such that the output signal of the upstream-side air-fuel ratio sensor repeatedly crosses a threshold value corresponding to a predetermined target air-fuel ratio, to cause the changing direction of the output signal to repeatedly reverse. In this case, the reversal frequency of the upstream-side air-fuel ratio sensor output corresponds to actual fluctuation of the air-fuel ratio during the air-fuel ratio feedback control. On the other hand, the reversal frequency of the downstream-side air-fuel ratio sensor output is significantly small compared with fluctuation of the air-fuel ratio if the exhaust purifying catalyst is not deteriorated, and corresponds to fluctuation of the air-fuel ratio if the catalyst is deteriorated. Therefore, whether the catalyst is deteriorated or not can be determined based on the reversal frequencies of the two sensor outputs, thus permitting accurate deterioration determination.

More preferably, the deterioration diagnostic apparatus of the aforementioned preferred embodiment is used with a three-way catalyst as the exhaust purifying catalyst. The air-fuel ratio control means controls the air-fuel ratio of the mixture to or near the stoichiometric air-fuel ratio. In this case, the reversal frequency of the downstream-side air-fuel ratio sensor output reflects well the degree of deterioration of the catalyst, permitting accurate deterioration determination.

In the preferred embodiment including the deterioration information quantity computing means, the deterioration information quantity computing means preferably calculates the ratio of the reversal frequency of the output signal of the downstream-side air-fuel ratio sensor detected by the first reversal frequency detecting means, to the reversal frequency of the output signal of the upstream-side air-fuel ratio sensor detected by the second reversal frequency detecting means, and then calculates the quantity of catalyst deterioration information based on the thus-calculated reversal frequency ratio. In this case, the determination as to deterioration of the catalyst can be made with accuracy based on the catalyst deterioration information quantity obtained from the reversal frequency ratio which varies considerably depending on whether the exhaust purifying catalyst is deteriorated or not.

More preferably, the deterioration information quantity computing means repeatedly calculates the reversal frequency ratio, obtains an average of the values of the reversal frequency ratio calculated during a predetermined time, and calculates the catalyst deterioration information quantity based on the average value. In this case, adverse influence of noise, for example, upon the reversal frequency ratio can be eliminated, and thus the possibility of erroneous determination being caused due to noise or the like can be lessened, permitting even more accurate deterioration determination.

Still preferably, while repeatedly obtaining the average of calculated values of the reversal frequency ratio, the deterioration information quantity computing means accumulates the average values to obtain an accumulated value thereof, and calculates the catalyst deterioration information quantity based on a value obtained by dividing a final accumulated value by the number of times the accumulation of the average values has been repeated. In this case, the accuracy in calculating the catalyst deterioration information quantity, and thus the accuracy in the determination as to deterioration of the catalyst, can be further improved.

Further preferably, the deterioration determining means obtains the final accumulated value of average values of the reversal frequency ratio for each of the at least two operating regions when the number of accumulations of the calculated reversal frequency ratio has become greater than a corresponding one of predetermined numbers set in advance for the respective operating regions. In this case, the final accumulated value of average values of the reversal frequency ratio associated with each operating region, and thus the quantity of catalyst deterioration information associated with each operating region, can be made even more proper, permitting accurate deterioration determination.

In the preferred embodiment including the deterioration information quantity computing means, preferably, while repeatedly calculating the quantity of catalyst deterioration information for the operating region determined by the operating region determining means, the deterioration information quantity computing means sequentially accumulates the calculated quantities of catalyst deterioration information. The deterioration determining means makes the deterioration determination when the number of accumulations of the calculated catalyst deterioration information quantity, accumulated by the deterioration information quantity computing means for each of the operating regions, has become greater than a corresponding one of predetermined numbers set in advance for the respective operating regions. In this case, it is possible to acquire a sufficient quantity of catalyst deterioration information for each of the operating regions, permitting accurate deterioration determination.

In the preferred embodiment including the operating region determining means, the plural operating regions are preferably set based at least on information about load (e.g., intake air amount) of the internal combustion engine. In this case, it is possible to obtain the catalyst deterioration information quantity reflecting the magnitude and change of load on the internal combustion engine which affect the reversal frequency ratio, permitting accurate deterioration determination.

The plural operating regions may alternatively include at least a high-speed, high-load operating region and a low-speed, low-load operating region. In this case, it is possible to obtain the catalyst deterioration information quantity reflecting the operating state of the internal combustion engine, which affects the reversal frequency ratio, thus permitting accurate deterioration determination.

In the preferred embodiment wherein the quantity of catalyst deterioration information is calculated based on the average of calculated values of the reversal frequency ratio, the deterioration information quantity computing means preferably suspends the calculation of the catalyst deterioration information quantity when the operating state of the internal combustion engine shifts between the plural operating regions during the predetermined time. According to this preferred embodiment, the deterioration determination is not made in cases where the number of calculations of the reversal frequency ratio is too small to properly obtain the catalyst deterioration information quantity, making it possible to prevent inaccurate deterioration determination.

BRIEF DESCRIPTION OF THE DRAWINGS

FIG. 10 is a graph showing the relationship between the reversal reference values $TH_H$ and $TH_L$ and the output voltage $V_{OR}$ in a conventional apparatus;

DETAILED DESCRIPTION OF THE PREFERRED EMBODIMENTS

A deterioration diagnostic apparatus for an exhaust purifying catalyst according to a first embodiment of the present invention will be now described.

Figure 1:
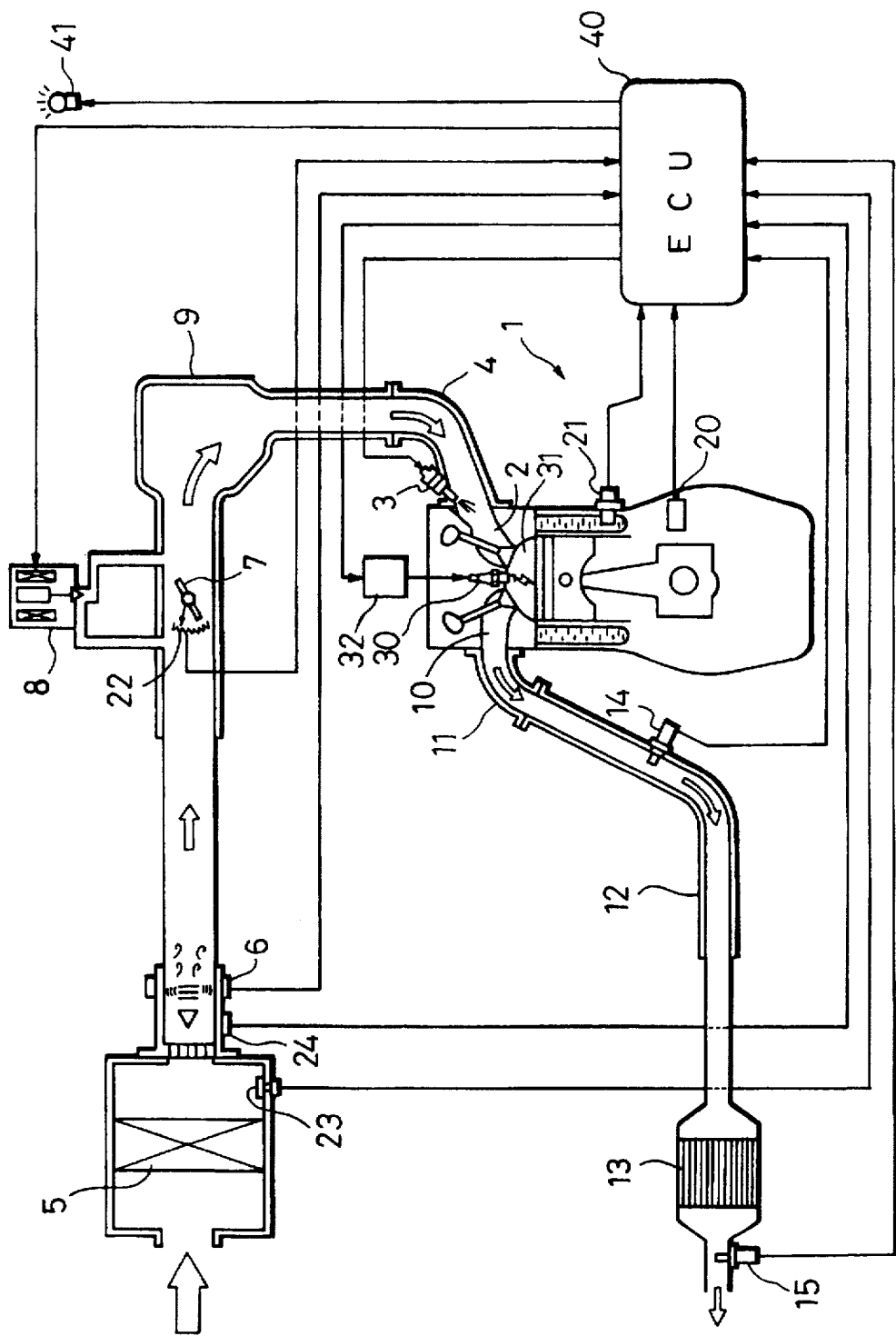
FIG. 1 is a schematic view showing a deterioration diagnostic apparatus according to a first embodiment of the present invention, along with an internal combustion engine to which the diagnostic apparatus is mounted.

Referring to FIG. 1, reference numeral 1 denotes an engine for a motor vehicle, for example, an in-line four-cylinder gasoline engine. The engine 1 has an intake port 2 connected to an intake manifold 4, which is provided with fuel injection valves 3 associated with respective cylinders. The intake manifold 4 is connected to an intake pipe 9, which is provided with an air cleaner 5 and a throttle valve 7. A bypass passage bypassing the throttle valve 7 is provided with an idle speed control (ISC) valve 8 for adjusting the amount of suction air supplied to the engine 1 through the bypass passage. The ISC valve 8 includes a valve member for increasing and decreasing the air flow area of the bypass passage, and a stepping motor for opening and closing the valve member.

The engine 1 also has an exhaust port 10 connected to an exhaust manifold 11, to which is connected a muffler, not shown, through an exhaust pipe 12 and a three-way catalyst (exhaust purifying catalyst) 13. Reference numeral 30 denotes a spark plug for igniting a gas mixture of air and fuel supplied to a combustion chamber 31 from the intake port 2, and 32 denotes an ignition unit connected to the spark plug 30.

Further, the engine 1 is provided with a deterioration diagnostic apparatus for determining whether or not the three-way catalyst 13 has deteriorated.

The deterioration diagnostic apparatus has operating state detecting means for detecting the operating state of the engine 1. The operating state detecting means includes various sensors mentioned below, and most of these sensors are used also for normal engine operation control.

In FIG. 1, reference numeral 6 denotes a Karman vortex-type airflow sensor mounted to the intake pipe 9 for detecting the amount of intake air, and 14 and 15 denote upstream- and downstream-side $O_2$ sensors (air-fuel ratio sensors), respectively, mounted to the peripheral wall of the exhaust pipe 12 on upstream and downstream sides, respectively, of the three-way catalyst 13 so as to face the interior of the exhaust pipe 12. These $O_2$ sensors 14 and 15 generate voltages corresponding to the oxygen concentrations of the exhaust gas before and after passing the three-way catalyst 13, respectively. Reference numeral 20 denotes a crank angle sensor including an encoder interlocked with the camshaft of the engine 1 for generating a crank angle synchronization signal, 21 denotes a water temperature sensor for detecting engine cooling water temperature $T_W$, and 22 denotes a throttle sensor for detecting the opening $\theta_{TH}$ of the throttle valve 7. Reference numeral 23 denotes an atmospheric pressure sensor for detecting the atmospheric pressure Pa, and 24 denotes an intake air temperature sensor for detecting intake air temperature Ta.

The deterioration diagnostic apparatus also includes an electronic control unit (ECU) 40 as its principal part. The ECU 40 has input/output devices, storage devices (ROM, RAM, nonvolatile RAM, etc.) storing various control programs and the like, a central processing unit (CPU), timer counters, etc. (none of these elements are shown). The aforementioned various sensors are electrically connected to the input side of the ECU 40, and the fuel injection valves 3, the stepping motor of the ISC valve 8, etc. are electrically connected to the output side of the ECU 40. Reference numeral 41 denotes a warning lamp which is arranged inside the compartment and which lights up when the three-way catalyst 13 has deteriorated, in order to call the driver's attention.

The ECU 40 calculates an engine rotational speed Ne based on the generation intervals of the crank angle synchronization signals supplied thereto from the crank angle sensor 20. Also, the ECU 40 calculates an intake air amount (A/N) per suction stroke on the basis of the engine rotational speed and the output of the airflow sensor 6, and then calculates a volumetric efficiency equivalent value (hereinafter referred to as volumetric efficiency $\eta_v$) by dividing the calculated intake air amount (A/N) by a full-open A/N of an identical engine rotational speed. Further, the ECU 40 detects the operating state of the engine 1 on the basis of the calculated engine rotational speed Ne, the calculated intake air amount (A/N), the calculated volumetric efficiency $\eta_n$, the oxygen concentration of the exhaust gas detected by the $O_2$ sensor 14, etc. Namely, the ECU 40 constitutes the operating state detecting means in cooperation with the various sensors.

In accordance with the engine operating state thus determined, the ECU 40 controls the amount of fuel injection from the fuel injection valves 3 to the engine 1. In this fuel injection amount control, the ECU 40 calculates a valve open time $T_{INJ}$ for the fuel injection valves 3 according to the equation below, and supplies the individual fuel injection valves 3 with a driving signal corresponding to the calculated valve open time $T_{INJ}$, to open the valves 3 and thereby inject a required amount of fuel to each cylinder.

$$T_{INJ} = T_B \times K_{AF} \times K_{IA} + T_{DEAD}$$

where $T_B$ represents a basic injection amount obtained from the volumetric efficiency $\eta_v$, etc., and $K_{IA}$ represents the product ($K = K_{WT} \cdot K_{AT} \cdot \ldots$) of correction coefficients including a water temperature correction coefficient $K_{WT}$, an intake air temperature correction coefficient $K_{AT}$, etc. Symbol $K_{AF}$ represents an air-fuel ratio correction coefficient, and $T_{DEAD}$ represents a dead time correction value which is set in accordance with the battery voltage and the like.

While the engine 1 is operated in an air-fuel ratio feedback region, the ECU 40, which serves as air-fuel ratio feedback control means, calculates an air-fuel ratio feedback correction coefficient $K_{IFB}$ as the air-fuel ratio correction coefficient $K_{AF}$, according to the following equation:

$$K_{IFB} = 1.0 + P + I + I_{LRN}$$

where P represents a proportional correction value, I represents an integral correction value (integral correction coefficient), and $I_{LRN}$ represents a learning correction value. The learning correction value $I_{LRN}$ is set through learning-based correction to a value such that the central value of the feedback correction coefficient $K_{IFB}$ becomes "1.0" and is stored in the nonvolatile RAM. The use of the learning correction value $K_{IFB}$ permits improvement in the accuracy of open-loop fuel injection amount control and also permits reduction in the deviation of fuel injection amount at the start of air-fuel ratio feedback control.

More specifically, the ECU 40 starts the air-fuel ratio feedback control when predetermined conditions, such as completion of activation of the upstream-side $O_2$ sensor 14 and an operation of the engine 1 in a state other than high-load, high-speed operating state, are fulfilled. An output voltage $V_{OF}$ of the upstream-side $O_2$ sensor 14 is at a minimum voltage (e.g., 0 V) when the air-fuel ratio of the mixture is within a region in which the air-fuel mixture is leaner than the stoichiometric mixture (ratio: 14.7), and is at a maximum voltage (e.g., 1.0 V) when the air-fuel ratio is within a fuel-rich region. In this air-fuel ratio feedback control, the ECU 40 compares the output voltage $V_{OF}$ of the upstream-side $O_2$ sensor 14 with a predetermined threshold $V_{TH}$ (e.g., 0.5 V), to thereby subject the air-fuel ratio to feedback correction. Specifically, when the output voltage $V_{OF}$ has decreased below the threshold $V_{TH}$ (e.g., 0.5 V), the ECU 40 gradually increases the fuel injection time $T_{INJ}$ so that the air-fuel ratio of the mixture may shift toward the rich side. Conversely, when the output voltage $V_{OF}$ has exceeded the threshold $V_{TH}$, the ECU 40 gradually decreases the fuel injection time $T_{INJ}$ so that the air-fuel ratio may shift toward the lean side. As a result, the air-fuel ratio of the mixture is always kept at a value close to the stoichiometric ratio, and accordingly, the exhaust gas is purified by the three-way catalyst 13 at high efficiency.

The ECU 40 also controls the ignition timing of the spark plug 30 by controlling the operation of the ignition unit 32. Further, the ECU 40 controls the opening of the ISC valve 8 by controlling the operation of the stepping motor of the ISC valve 8 in accordance with the engine operating state. In this case, the ECU 40 calculates a deviation of the engine rotational speed from a target rotational speed, and subjects the ISC valve 8 to feedback control so that the deviation may become smaller than a predetermined deviation, thereby maintaining the engine rotational speed during idling substantially constant.

Figure 2:
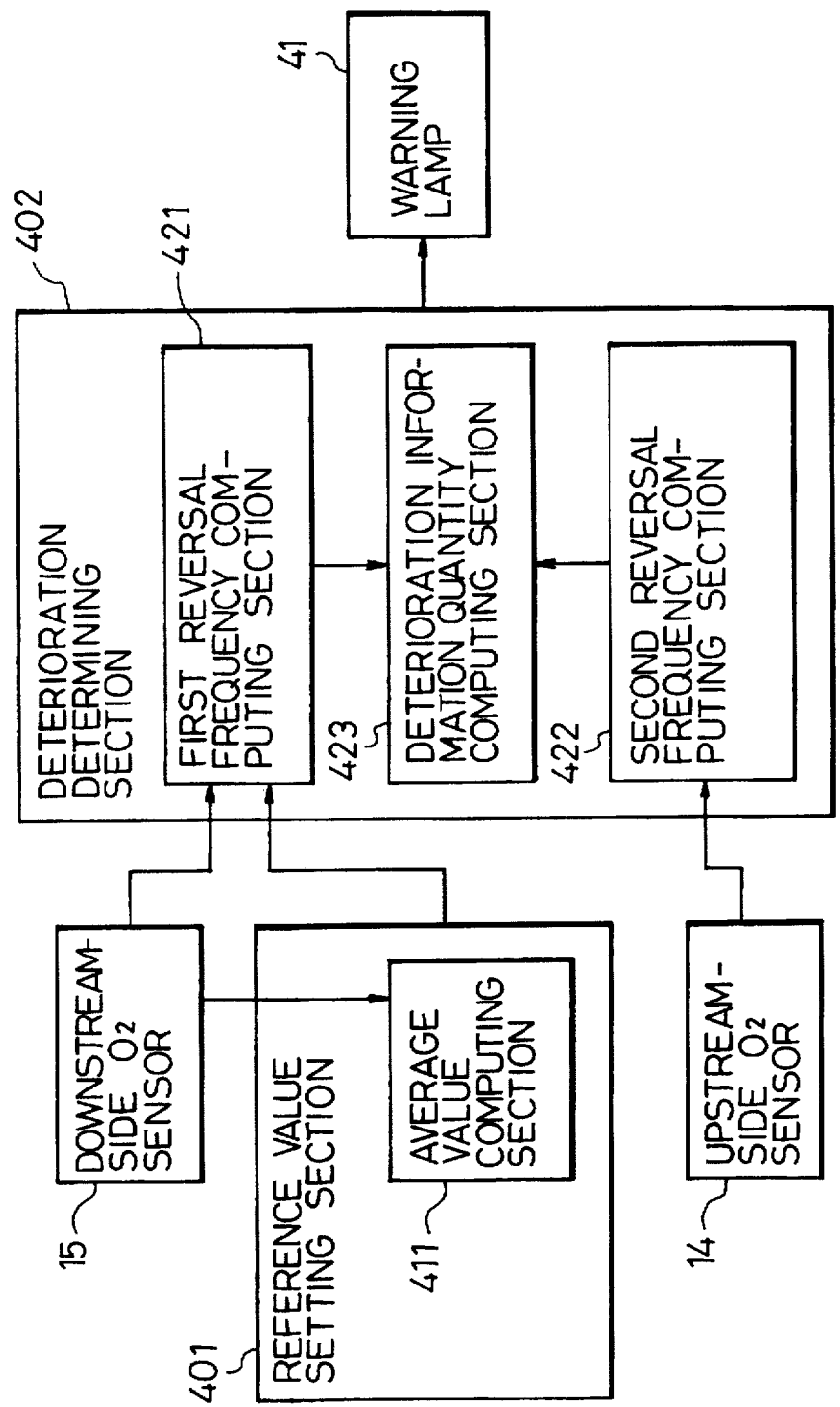
FIG. 2 is a block diagram showing various function parts of an electronic control unit (ECU) shown in FIG. 1.

In connection with the determination as to the catalyst deterioration, the ECU 40 has various function parts as shown in FIG. 2. Specifically, the ECU 40 includes a reference value setting section 401 for variably setting a reversal reference value in accordance with plural input values of the output signal from the downstream-side $O_2$ sensor 15, and a deterioration determining section 402 for determining whether the three-way catalyst 13 is deteriorated or not based on the number of times the output signal of the $O_2$ sensor 15 has crossed the reversal reference value.

The reference value setting section 401 includes an average value computing section 411 for computing an average of input values of the output signal from the $O_2$ sensor 15, and variably sets the reversal reference value in accordance with the computed average value.

The deterioration determining section 402 includes a first reversal frequency detecting section 421 for detecting the frequency of reversals of the changing direction in which the output of the $O_2$ sensor 15 changes, on the basis of the number of times the output signal of the $O_2$ sensor 15 has crossed the reversal reference value; a second reversal frequency detecting section 422 for detecting the frequency of reversals of the changing direction in which the output signal of the upstream-side $O_2$ sensor 14 changes; and a deterioration information quantity computing section 423 for calculating the ratio of the reversal frequency detected by the first detecting section 421 to the reversal frequency detected by the second detecting section 422 and computing a quantity of catalyst deterioration information based on the calculated reversal frequency ratio. The deterioration determining section 402 determines whether the three-way catalyst 13 is deteriorated or not based on the quantity of catalyst deterioration information, and lights the warning lamp 41 when it is judged that the three-way catalyst 13 is deteriorated.

Referring now to the flowcharts of FIGS. 3 through 6 and the graphs of FIGS. 7 and 8, a catalyst deterioration diagnosis procedure according to this embodiment will be explained.

Figure 3:
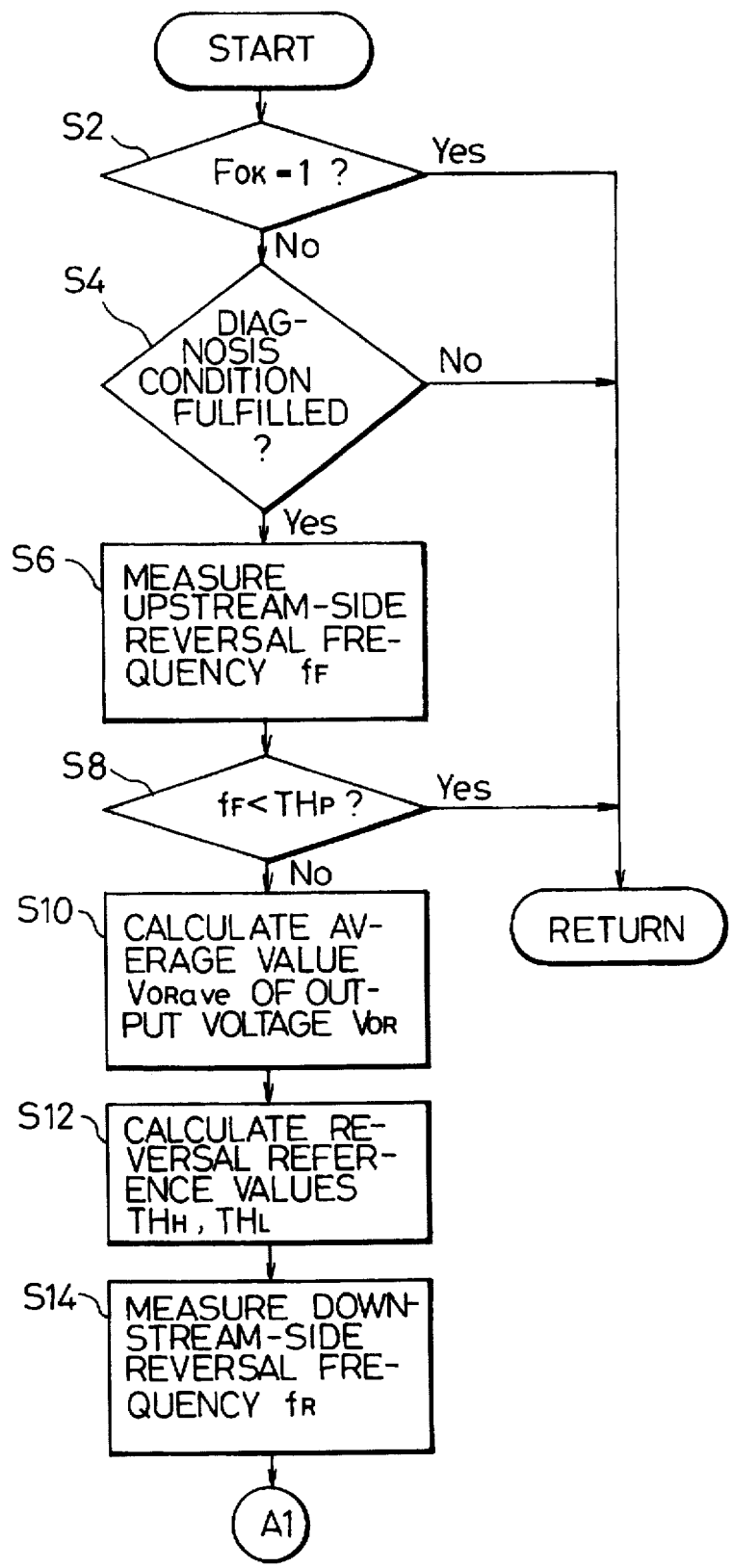
FIG. 3 is a flowchart showing part of a catalyst deterioration diagnosis subroutine according to the first embodiment of the invention, executed by the ECU in FIG. 1.
Figure 4:
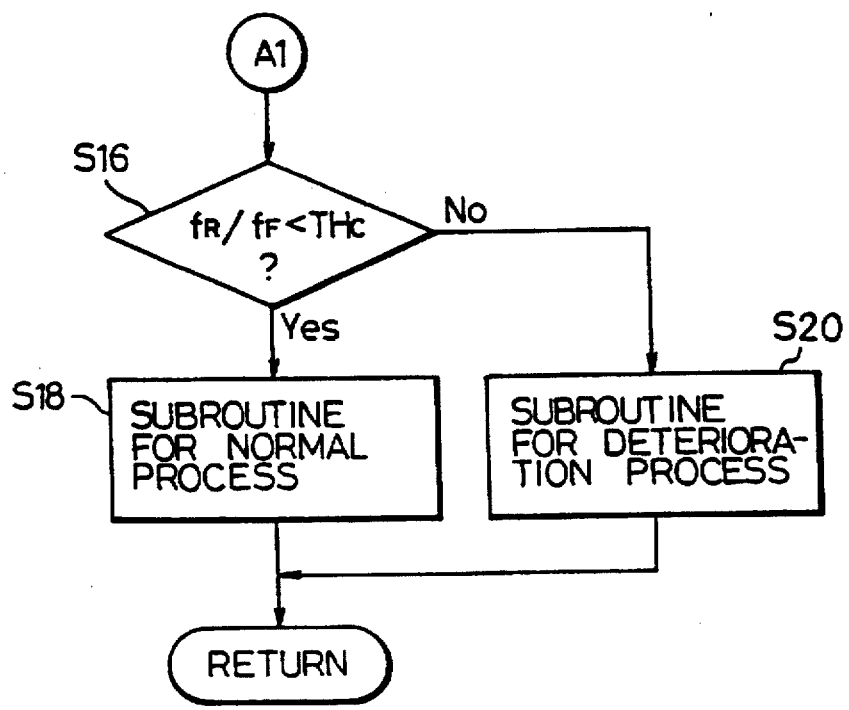
FIG. 4 is a flowchart showing the remaining part of the catalyst deterioration diagnosis subroutine following the part shown in FIG. 3.

When the ignition switch is turned on by the driver and thus the engine 1 starts, the ECU 40 starts to execute a catalyst deterioration diagnosis subroutine shown in FIGS. 3 and 4. In this subroutine, the ECU 40 first determines in Step S2 in FIG. 3 whether or not a flag $F_{OK}$ equals the value "1" which indicates that the three-way catalyst 13 is functioning normally. The flag $F_{OK}$ is reset to the value "0" each time the ignition switch is turned off, and is set to the value "1" when it is judged that the three-way catalyst 13 is normal. Immediately after the start of the engine 1, therefore, the flag $F_{OK}$ necessarily takes the value "0". Accordingly, the result of the decision in Step S2 is No (negative), and the control flow proceeds to Step S4.

In Step S4, the ECU 40 is supplied with the outputs of the various sensors and then determines whether a condition for performing catalyst deterioration diagnosis is fulfilled. The deterioration diagnosis condition is fulfilled when all requirements are satisfied, which requirements include a first requirement that the air-fuel ratio feedback control is under execution, a second requirement that the engine rotational speed Ne falls within a predetermined range, a third requirement that the volumetric efficiency $\eta_v$ falls within a predetermined range, and a fourth requirement that both the $O_2$ sensors 14 and 15 are operating normally. The reason why the second and third requirements are provided is that if the second or third requirement is not fulfilled, then the concentration of $O_2$ in the exhaust gas is unstable, impeding proper execution of the air-fuel ratio feedback control.

The following expressions (1) and (2) correspond to the second and third requirements, respectively:

$$Ne1 < Ne < Ne2 \tag{1}$$

$$\eta_{v1} < \eta_v < \eta_{v2} \tag{2}$$

In expressions (1) and (2), Ne1, Ne2, $\eta_{v1}$ and $\eta_{v2}$ are discriminating thresholds and are set, for example, to 1400 rpm, 3000 rpm, 25% and 60%, respectively.

If No in Step S4, that is, if the deterioration diagnosis condition is not fulfilled, execution of this subroutine for the present control cycle is ended, and upon lapse of a time corresponding to a predetermined control interval, the subroutine is again executed from Step S2.

If the result of the decision in Step S4 is Yes (affirmative), that is, if the deterioration diagnosis condition is fulfilled, the ECU 40 calculates, based on the output signal from the upstream-side $O_2$ sensor 14, a frequency $f_F$ of reversals of the changing direction of this sensor output signal, in Step S6. For example, the number of times the output voltage $V_{OF}$ of the upstream-side $O_2$ sensor 14 changes across the threshold $V_{TH}$ (e.g., 0.5 V) during a predetermined time (e.g., 10 seconds) is obtained, and then the obtained number is divided by the predetermined time to obtain the upstream-side reversal frequency $f_F$.

Subsequently, in Step S8, the ECU 40 determines whether or not the reversal frequency $f_F$ of the upstream-side $O_2$ sensor output is smaller than a predetermined value $T_{Hp}$, to thereby determine whether the upstream-side $O_2$ sensor 14 has deteriorated or not. The predetermined value $T_{Hp}$ is set in advance to a suitable value (e.g., 0.1 Hz) based on experimental data, taking account of a discriminating threshold $T_{Hc}$ for the reversal frequency ratio $f_R/f_F$ (the ratio of the reversal frequency $f_R$ of the downstream-side $O_2$ sensor output to the reversal frequency $f_F$ of the upstream-side $O_2$ sensor output).

The upstream-side $O_2$ sensor 14 is always exposed to high-temperature exhaust gas and thus is more liable to heat deterioration than the downstream-side $O_2$ sensor 15. If the $O_2$ sensor 14 is deteriorated, in many cases the response to fluctuations in the air-fuel ratio lowers and the sensor fails to output normal electromotive force. In such cases, the output voltage of the upstream-side $O_2$ sensor 14 does not show a precise change, with the result that the upstream-side reversal frequency $f_F$ becomes lower than that in normal cases. If the upstream-side reversal frequency $f_F$ lowers in this manner, the reversal frequency ratio $f_R/f_F$ increases, possibly causing an erroneous determination that the three-way catalyst 13 is deteriorated.

Therefore, if the result of the decision in Step S8 is Yes, that is, if it is judged that the upstream-side $O_2$ sensor 14 has deteriorated and is not normally functioning, the control flow returns to "START." In this case, only the sequence of Steps S2, S4, S6 and S8 is repeatedly executed, and no substantial catalyst deterioration diagnosis process is carried out. Namely, the catalyst deterioration diagnosis is suspended.

On the other hand, if the result of the decision in Step S8 is No, that is, if the upstream-side $O_2$ sensor 14 is normal, the ECU 40 calculates an average $V_{ORave}$ of input values of the output voltage $V_{OR}$ of the downstream-side $O_2$ sensor 15 according to the equation given below, in Step S10. In the equation, $V_{ORave(n-1)}$ represents an average value calculated in the preceding cycle, $V_{OR}$ represents the present output voltage value of the downstream-side $O_2$ sensor 15, and a represents a filter constant. Namely, in this embodiment, the $O_2$ sensor output voltage value, input in Step S4 of the present control cycle, and the average value $V_{ORave(n-1)}$ already calculated in Step S10 of the preceding control cycle are used as plural input values of the $O_2$ sensor output voltage $V_{OR}$.

$$V_{ORave} = a \times V_{ORave(n-1)} + (1-a) \times V_{OR}$$

If the output voltage $V_{OR}$ of the downstream-side $O_2$ sensor 15 shifts to the rich or lean side, the average value $V_{ORave}$ calculated according to the above equation also shifts following the shifting of the sensor output voltage. It is, therefore, possible to eliminate the influence of the sensor output voltage shift upon the catalyst deterioration determination based on the sensor output voltage. In addition, by suitably setting the filter constant a, the rate at which the average value $V_{ORave}$ follows the shifting of the sensor output voltage can be set at a suitable level.

After calculating the average value $V_{ORave}$ in Step S10, the ECU 40 calculates upper and lower reversal reference values $TH_H$ and $TH_L$ according to the equations given below, in Step S12. In the equations, $\Delta V_{OR}$ represents a hysteresis constant, and in this embodiment, is set to about 0.05 V, for example.

$$TH_H = V_{ORave} + \Delta V_{OR}$$

$$TH_L = V_{ORave} - \Delta V_{OR}$$

Then, in Step S14, the ECU 40 obtains the number of times the output voltage $V_{OR}$ of the downstream-side $O_2$ sensor 15 has crossed the upper and lower reversal reference values $TH_H$ and $TH_L$ during the aforementioned predetermined time, and then divides the obtained number by the predetermined time to obtain a reversal frequency $f_R$ of the downstream-side $O_2$ sensor output.

Figure 7:
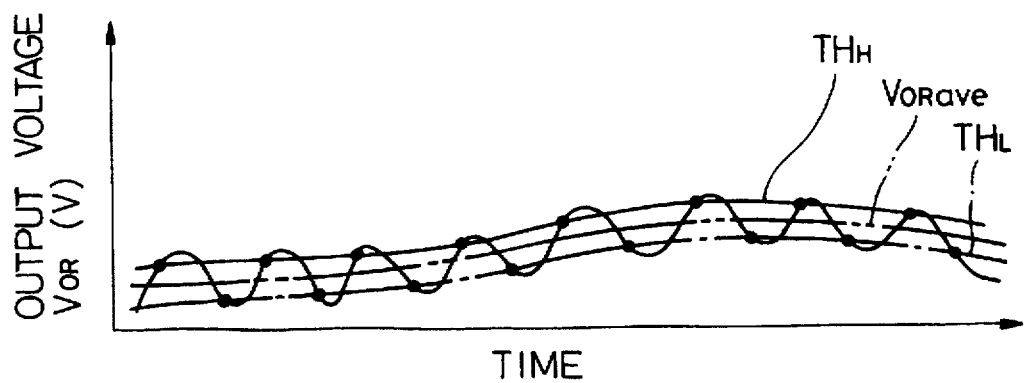
FIG. 7 is a graph showing the relationship between reversal reference values $TH_H$ and $TH_L$, used for determining the reversal frequency of a downstream-side $O_2$ sensor output in the subroutine shown in FIGS. 3 and 4, and an output voltage $V_{OR}$ of the downstream-side $O_2$ sensor.

FIG. 7 shows the relationship between the reversal reference values $TH_H$ and $TH_L$ and the output voltage $V_{OR}$ of the downstream-side $O_2$ sensor 15. The number of reversal detection points indicated by the mark "." in FIG. 7 is equal to the number of times the $O_2$ sensor output voltage $V_{OR}$ is actually reversed. Namely, when the output voltage $V_{OR}$ of the downstream-side $O_2$ sensor 15 shifts toward the rich or lean side, the reversal reference values $TH_H$ and $TH_L$ also shift in like manner, whereby the reversal frequency $f_R$ of the downstream-side sensor output can be measured with accuracy. The reason for using the upper and lower reversal reference values $TH_H$ and $TH_L$ for the measurement of the reversal frequency $f_R$ of the downstream-side sensor output is that the amplitude of the output voltage $V_{OR}$ of the downstream-side $O_2$ sensor 15 is so small that, if a single reversal reference value is used to measure the reversal frequency, the reversal frequency may be overestimated due to subtle fluctuations of the output voltage $V_{OR}$.

Subsequently, in Step S16 in FIG. 4, the ECU 40 calculates a reversal frequency ratio $f_R/f_F$ based on the reversal frequencies $f_F$ and $f_R$ of the upstream- and downstream-side sensor outputs, respectively, and determines whether or not the obtained value is greater than a predetermined value $T_{Hc}$ (e.g., 0.8), that is, whether or not the purification efficiency $E_{CAT}$ of the three-way catalyst 13 is lower than a lower limit value $E_1$ (e.g., about 85%) (see the purification efficiency $E_{CAT}$-reversal frequency ratio $f_R/f_F$ characteristic curve shown in FIG. 8). If Yes in Step S16, that is, if the three-way catalyst 13 is functioning normally with a purification efficiency of, for example, about 85% or more, it is judged that the three-way catalyst 13 is not deteriorated, and a subroutine for normal process (shown in detail in FIG. 5) is executed in Step S18.

Figure 5:
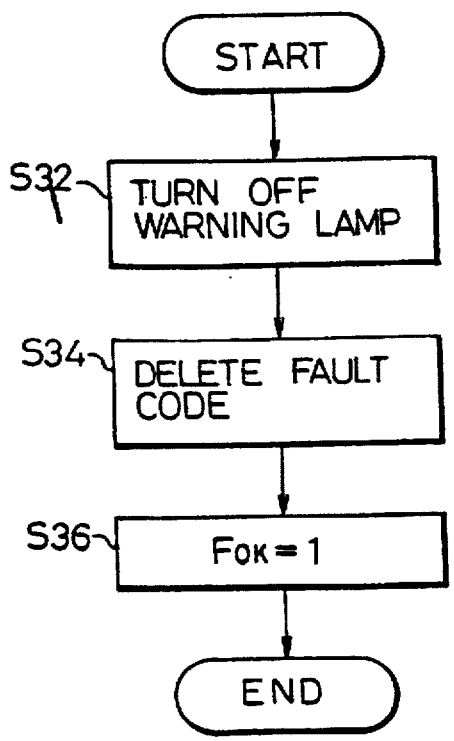
FIG. 5 is a flowchart showing details of a subroutine for normal process, executed in the subroutine shown in FIGS. 3 and 4.

In the subroutine for normal process, first, in Step S32 in FIG. 5, the ECU 40 turns off the warning lamp 41, thereby informing the driver that the three-way catalyst 13 is functioning normally. Then, in Step S34, a fault code indicative of deterioration of the three-way catalyst 13 is deleted if stored in the nonvolatile RAM of the ECU 40 at all. Next, in Step S36, the flag $F_{OK}$ is set to the value "1" which indicates that the three-way catalyst 13 is functioning normally.

Once the value of the flag FOK is set to "1" in this manner, the result of the decision in Step S2 becomes Yes when the catalyst deterioration diagnosis subroutine is executed next time. In this case, the subroutine is ended without again making the determination as to catalyst deterioration, unless the ignition switch is turned off.

On the other hand, if the reversal frequency ratio $f_R/f_F$ is greater than the predetermined value $T_{Hc}$ (0.8) and thus the result of the decision in Step S16 is No, then it means that the purification efficiency $E_{CAT}$ of the three-way catalyst 13 is lower than the lower limit value $E_1$; therefore, it is judged that the three-way catalyst 13 has deteriorated. In this case, a subroutine for deterioration process (shown in detail in FIG. 6) is executed in Step S20.

Figure 6:
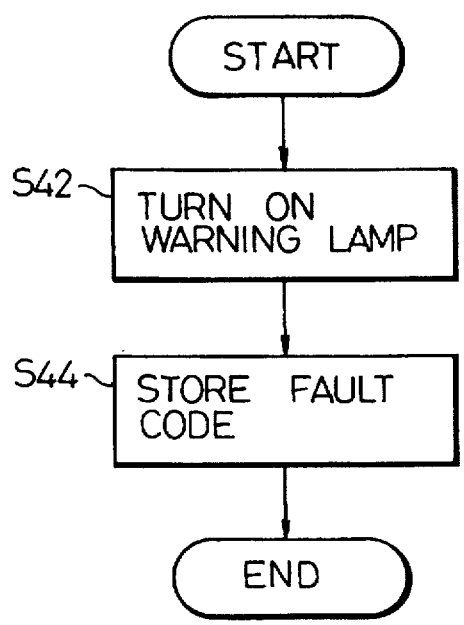
FIG. 6 is a flowchart showing details of a subroutine for deterioration process, executed in the subroutine shown in FIGS. 3 and 4.

In the subroutine for deterioration process, first, in Step S42 in FIG. 6, the warning lamp 41 is lighted, to thereby inform the driver of the deterioration of the three-way catalyst 13 and thus the need for repair. Then, in Step S44, the ECU 40 writes a fault code indicative of deterioration of the three-way catalyst 13 into the nonvolatile RAM. By reading out the fault code, therefore, deterioration of the three-way catalyst 13 can be readily let known, whereby necessary measures such as repair or replacement of the three-way catalyst 13 can be immediately taken.

A deterioration diagnostic apparatus for an exhaust purifying catalyst according to a second embodiment of the present invention will be now described.

Figure 11:
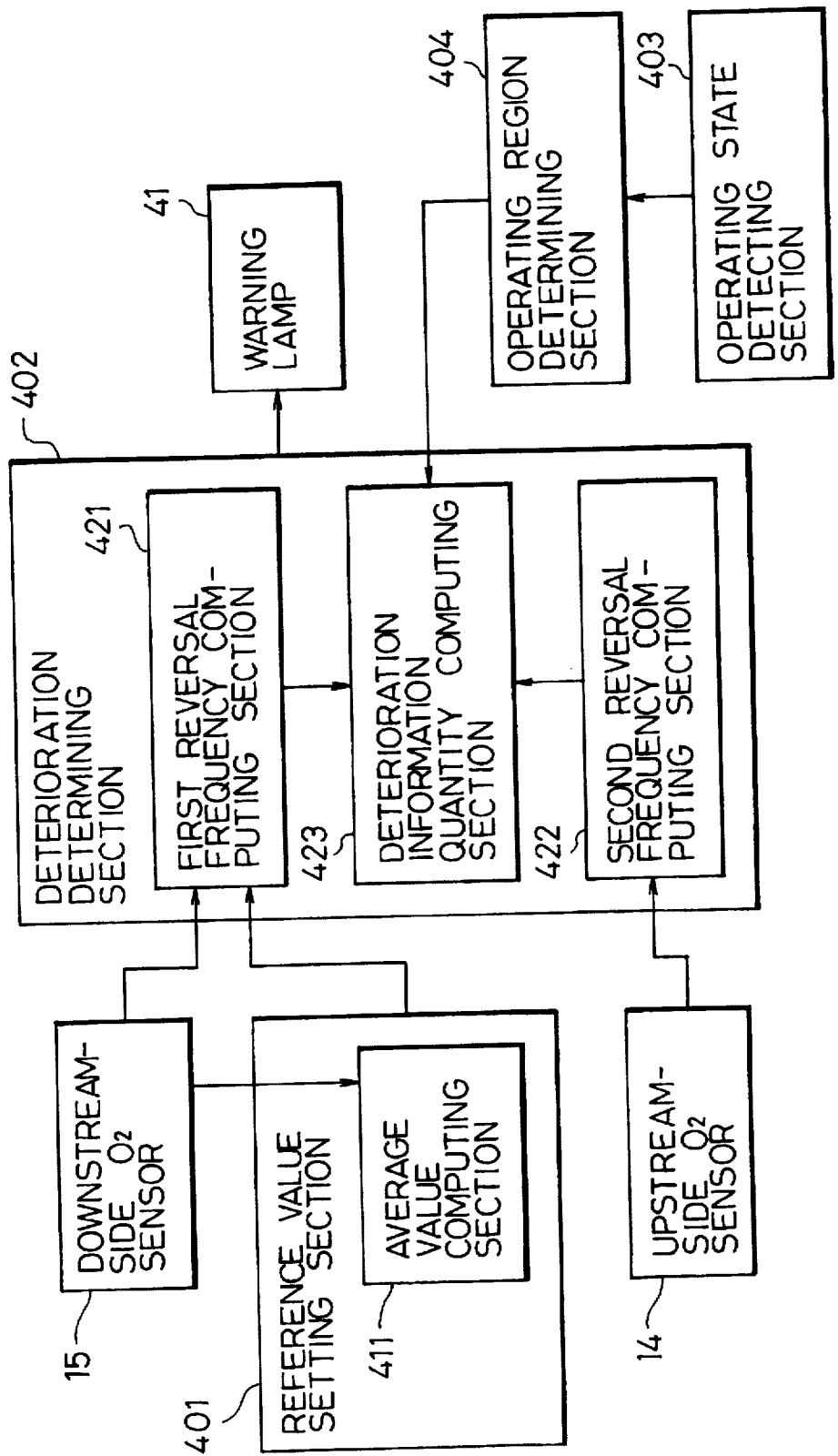
FIG. 11 is a block diagram showing various function parts of an electronic control unit (ECU) of a catalyst deterioration diagnostic apparatus according to a second embodiment of the present invention.

The apparatus of this embodiment is characterized in that the determination as to deterioration of the three-way catalyst is made cased on the quantities of catalyst deterioration information computed respectively for two operating regions of the internal combustion engine. In connection with this feature, the ECU 40 of the apparatus according to this embodiment includes, in addition to the reference value setting section 401 and the deterioration determining section 402 shown in FIG. 2, an operating state detecting section 403 for detecting the operating state of the engine 1 in cooperation with the various sensors, and an operating region determining section 404 for determining to which of preset operating regions the operating state of the engine 1 detected by the detecting section 403 belongs (see FIG. 11). For the other parts, the apparatus of this embodiment is constructed in the same manner as that of the first embodiment. Therefore, description of the construction of the apparatus according to this embodiment is omitted.

A catalyst deterioration diagnosis procedure according to this embodiment will be hereinafter described.

Figure 12:
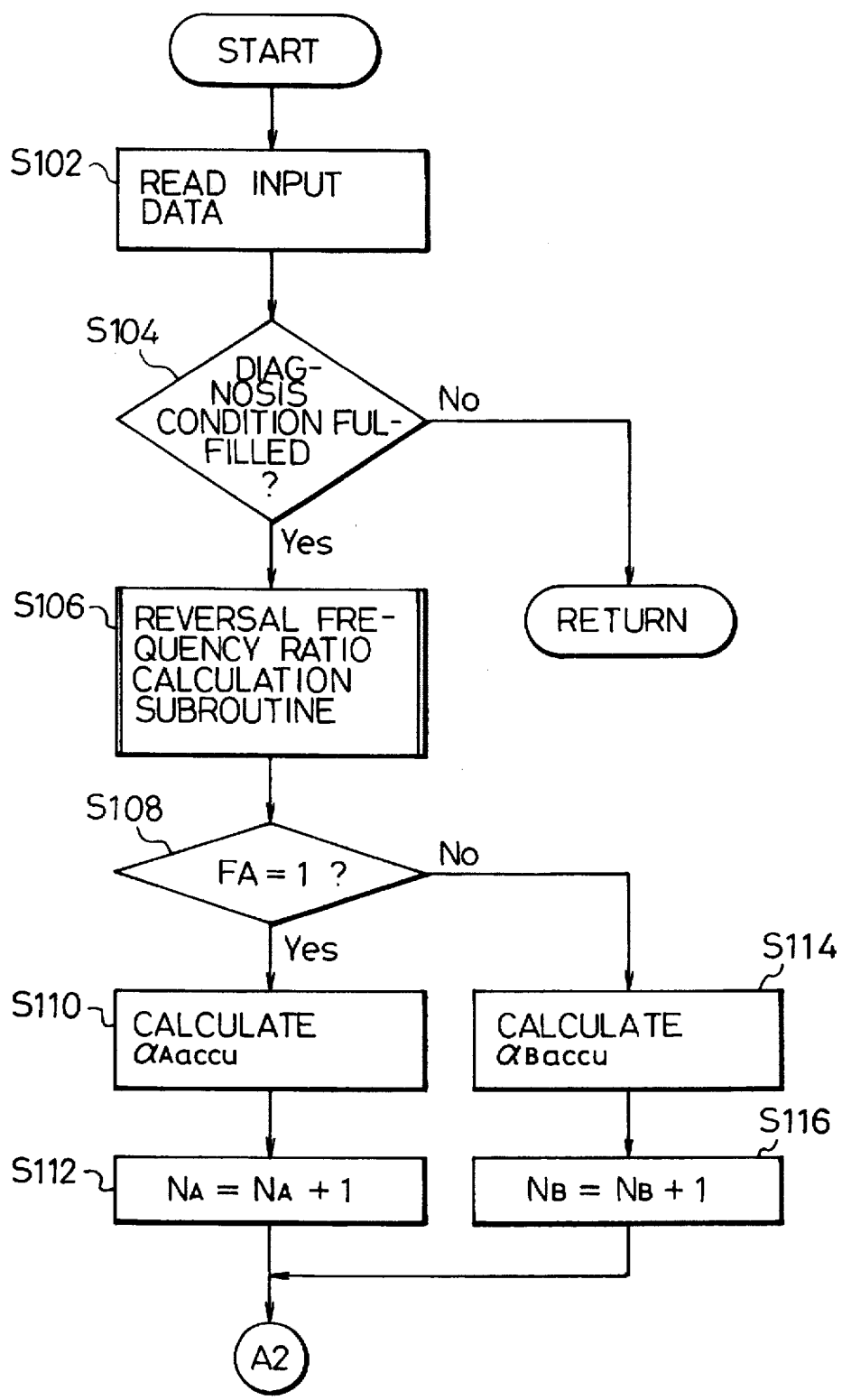
FIG. 12 is a flowchart showing part of a catalyst deterioration diagnosis subroutine executed by the ECU in FIG. 11.
Figure 13:
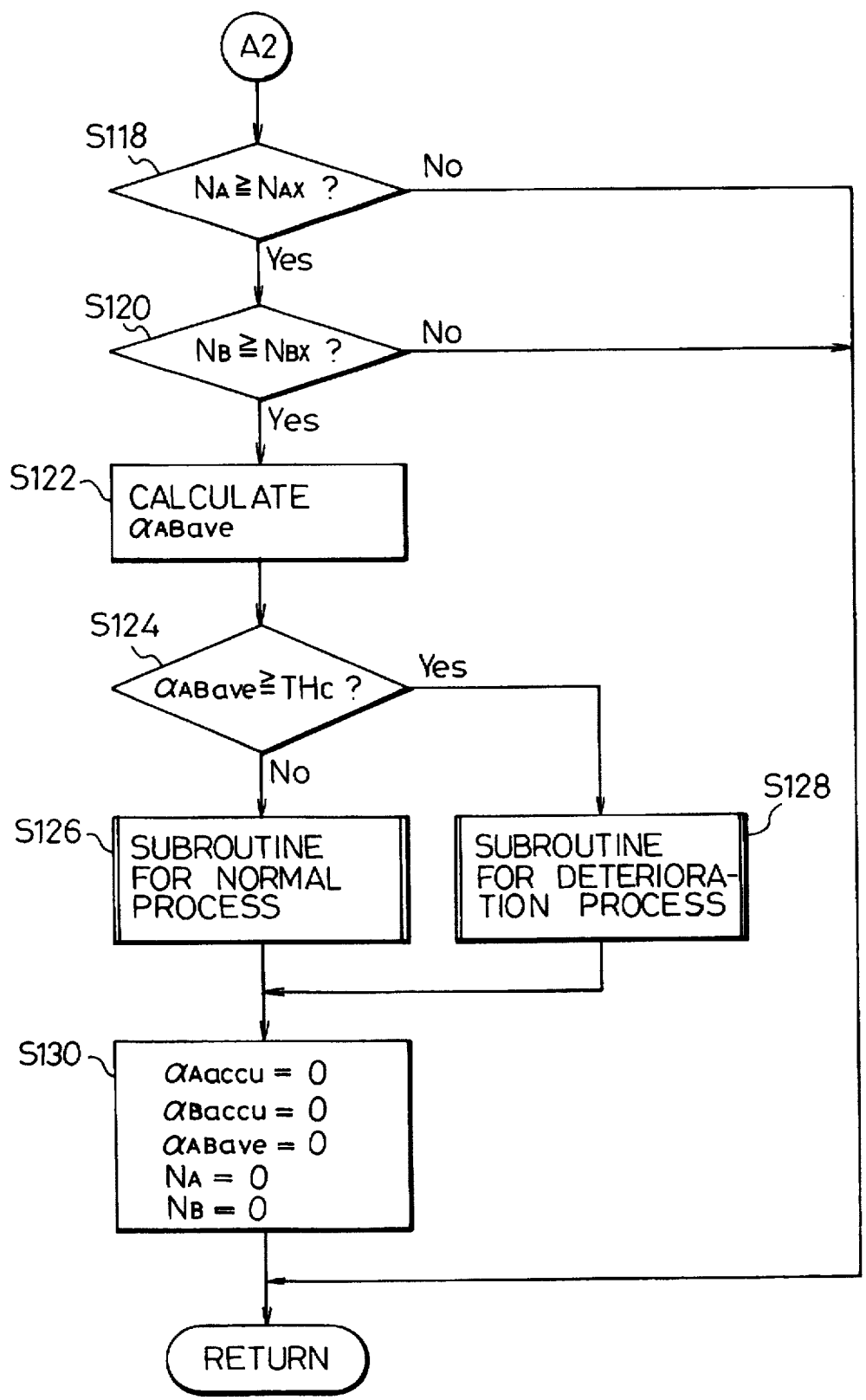
FIG. 13 is a flowchart showing the remaining part of the catalyst deterioration diagnosis subroutine following the part shown in FIG. 12.

When the ignition switch is turned on by the driver and thus the engine 1 starts, the ECU 40 starts to execute a catalyst deterioration diagnosis subroutine shown in FIGS. 12 and 13. In this subroutine, the ECU 40 first reads input data from the various sensors into RAM, in Step S102 in FIG. 12, and then determines whether or not a catalyst deterioration diagnosis condition is fulfilled, in Step S104. The catalyst deterioration diagnosis condition is fulfilled when all of requirements are satisfied, which requirements include a first requirement that the air-fuel ratio feedback control is under execution, and a second requirement that the $O_2$ sensors 14 and 15 are operating normally.

If No in Step S104, that is, if the catalyst deterioration diagnosis condition is not fulfilled, the control flow returns to "START."

On the other hand, if the catalyst deterioration diagnosis condition is fulfilled and thus the result of the decision in Step S104 is Yes, the ECU 40 executes a reversal frequency ratio calculation subroutine (shown in detail in FIGS. 14 and 15), in Step S106.

Figure 14:
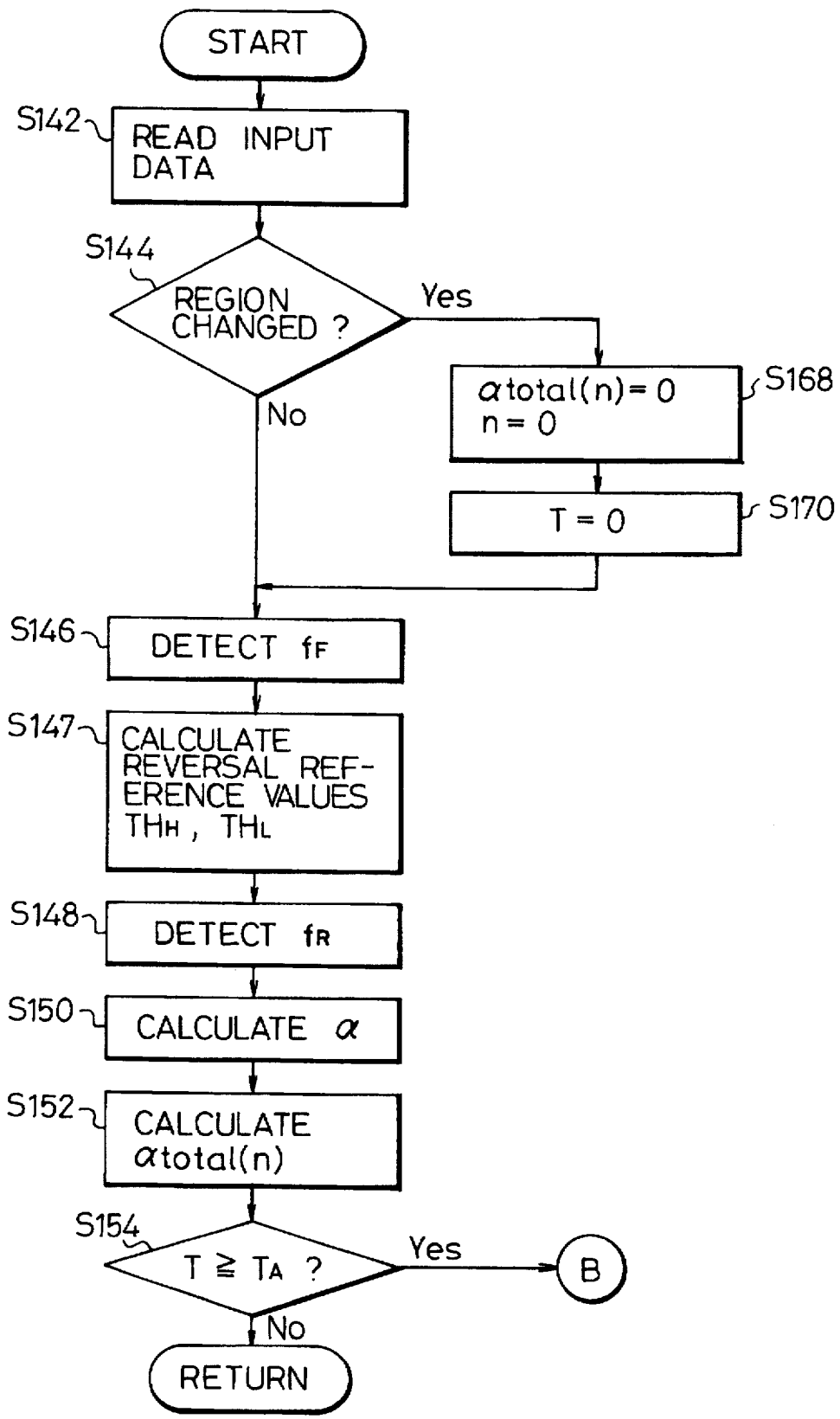
FIG. 14 is a flowchart showing in detail part of a reversal frequency ratio calculation subroutine executed in the subroutine shown in FIGS. 12 and 13.
Figure 15:
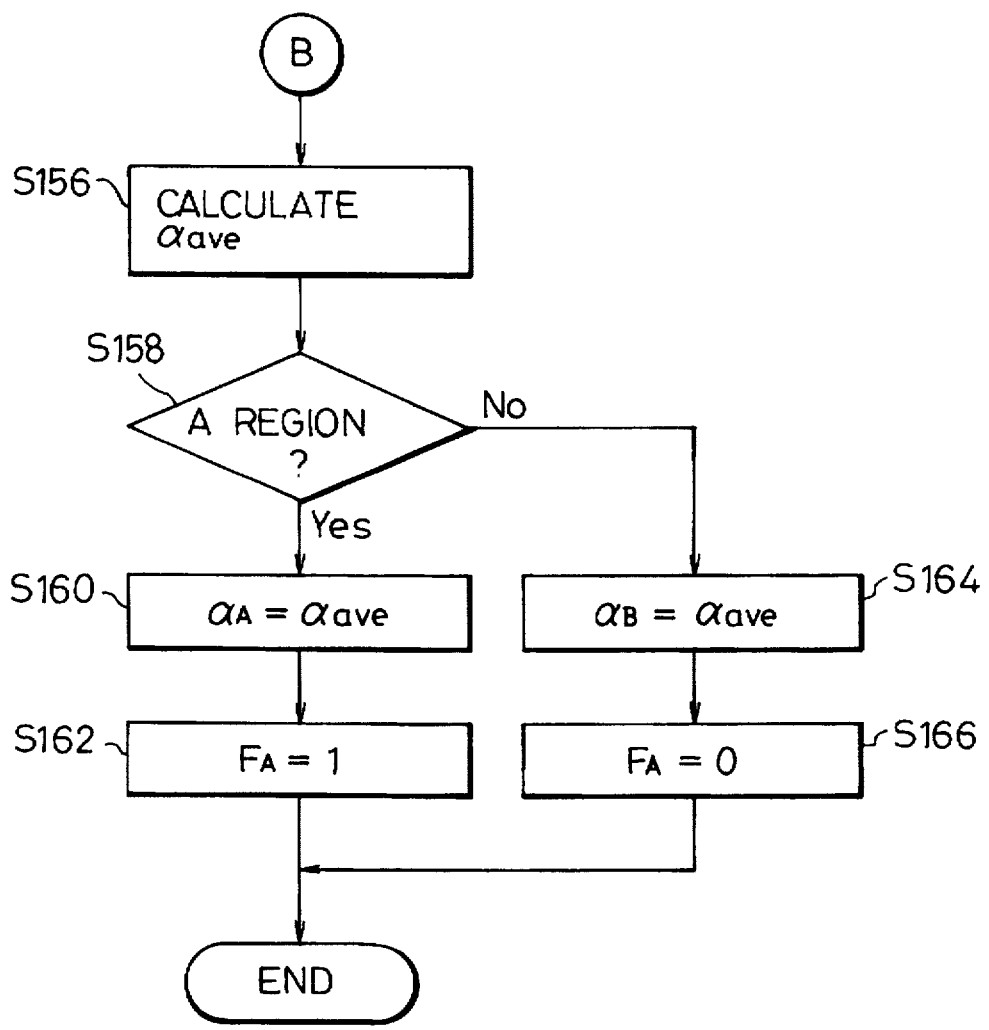
FIG. 15 is a flowchart showing the remaining part of the reversal frequency ratio calculation subroutine following the part shown in FIG. 14.
Figure 16:
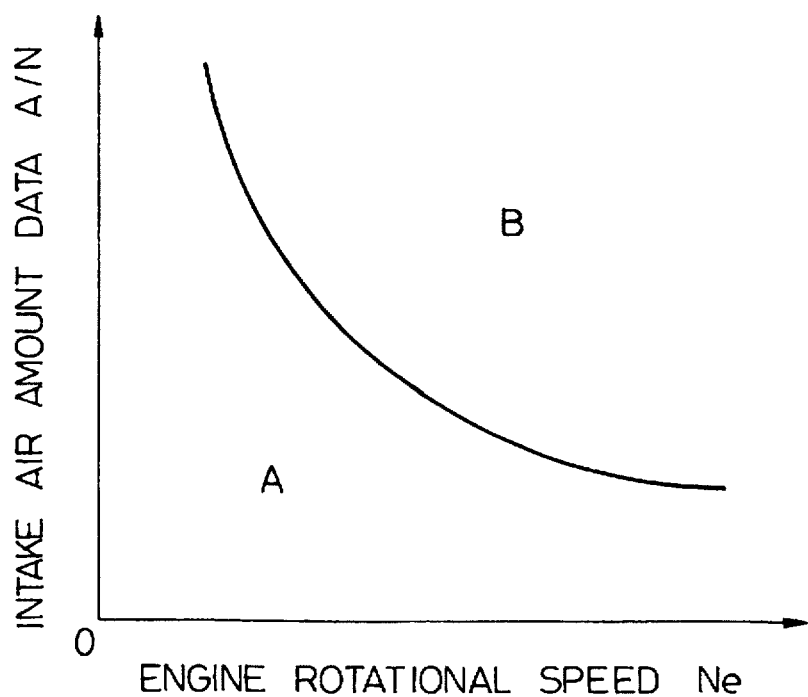
FIG. 16 is a graph showing an example of an engine operating region map which is used for determining the engine operating region in the subroutine shown in FIGS. 12 and 13 and which is set as a function of intake air amount information and engine rotational speed.

In the reversal frequency ratio calculation subroutine, the ECU 40 first reads again input data from the various sensors into RAM, in Step S142 in FIG. 14. Then, in Step S144, the ECU 40 determines, from an operating region map shown in FIG. 16, whether the present engine operating state falls within a low-speed, low-load operating region (A region) or a high-speed, high-load operating region (B region), based on the information about the intake air amount A/N, the engine rotational speed Ne, etc., and then determines whether or not the presently discriminated operating region is different from the previously discriminated operating region, that is, whether or not the engine operating region has changed during a period from the preceding discrimination time and the present discrimination time.

If the result of the decision in Step S144 is No, that is, if the engine operating region has undergone no change, the ECU 40 detects, based on the output signal of the upstream-side $O_2$ sensor 14, a reversal frequency $f_F$ of the upstream-side sensor output in Step S146, in the same manner as in Step S6 in FIG. 3. Then, in Step S147, the ECU 40 calculates an average output voltage $V_{ORave}$ of the downstream-side $O_2$ sensor 15 and also upper and lower reversal reference values $TH_H$ and $TH_L$, in the same manner as in Steps S10 and S12 in FIG. 3. In Step S148, like Step S14 in FIG. 3, a reversal frequency $f_R$ of the downstream-side sensor output is detected based on the output voltage $V_{OR}$ of the downstream-side $O_2$ sensor 15.

Subsequently, the ECU 40 calculates a reversal frequency ratio $\alpha(=f_R/f_F)$ by dividing the reversal frequency $f_R$ of the downstream-side sensor output by the reversal frequency $f_F$ of the upstream-side sensor output, in Step S150, and then calculates a total $\alpha_{total(n)}$ of the reversal frequency ratio $\alpha$ up to the present cycle (n'th cycle), by adding the presently calculated value $\alpha$ to a total $\alpha_{total(n-1)}$ of the reversal frequency ratio $\alpha$ calculated up to the preceding cycle, in Step S152 (see the equation below).

$$\alpha_{total(n)}=\alpha_{total(n-1)}+\alpha$$

Then, in Step S154, the ECU 40 determines whether or not the count value T (corresponding to the time period elapsed after the start of the reversal frequency ratio calculation subroutine) of a timer, which was started synchronously with the start of the calculation subroutine, has exceeded a predetermined time $T_A$ (in this embodiment, 10 seconds). If the result of this decision is No, the control flow returns to "START."

While the results of the decisions in both Steps S144 and S154 remain negative (No) thereafter, the aforementioned sequence of Steps S142, S144, S146, S148, S150, S152 and S154 is repeatedly executed. Namely, the total $\alpha_{total(n)}$ of the reversal frequency ratio $\alpha$ is successively updated until the predetermined time $T_A$ elapses from the start of this subroutine. When the predetermined time $T_A$ has elapsed and thus the result of the decision in Step S154 becomes Yes, the ECU 40 calculates an average value $\alpha_{ave}$ of the reversal frequency ratio $\alpha$ by dividing the present total $\alpha_{total(n)}$ by the number of additions n, in Step S156 in FIG. 15 (see the equation below).

$$\alpha_{ave} = \alpha_{total(n)}/n$$

Figure 8:
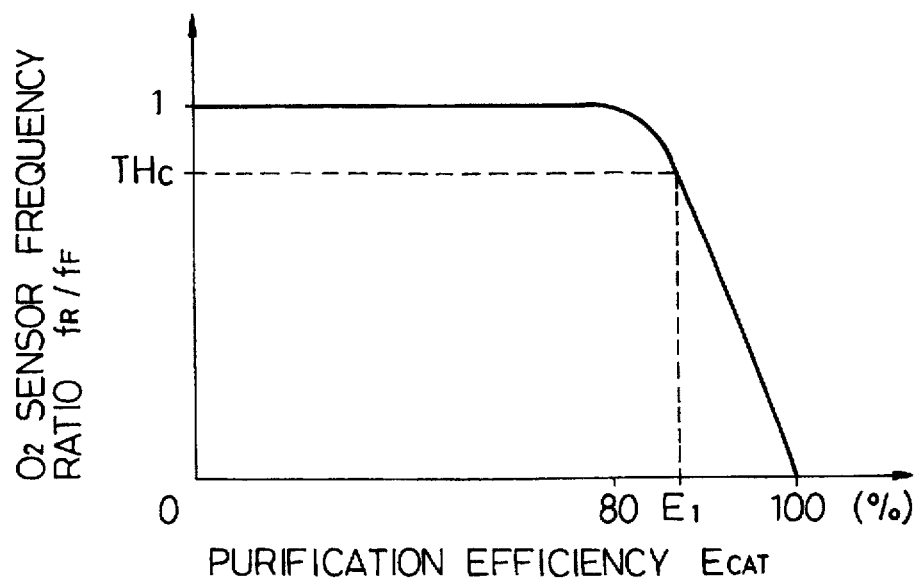
FIG. 8 is a graph showing the relationship between reversal frequency ratio $f_R/f_F$, used for determining deterioration of a catalyst in the subroutine shown in FIGS. 3 and 4, and a purification efficiency $E_{CAT}$.
Figure 9:
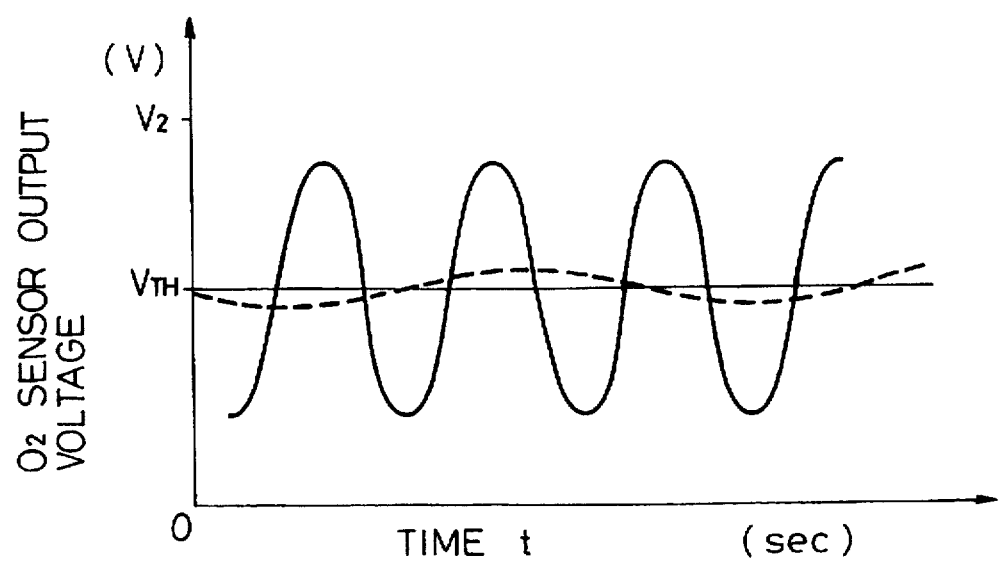
FIG. 9 is a graph showing time-based changes of the output voltages of upstream- and downstream-side $O_2$ sensors.

Then, in Step S158, the ECU 40 determines based on the operating region map of FIG. 8 whether or not the present engine operating state falls within the low-speed, low-load operating region. If the result of this decision is Yes, the average value $\alpha_{ave}$ calculated in Step S156 is set as a reversal frequency ratio $\alpha_A$ for the low-speed, low-load operating region (hereinafter referred to as A-region reversal frequency ratio), in Step S160, and a flag $F_A$ is set to the value "1" which indicates completion of the calculation of the A-region reversal frequency ratio $\alpha_A$, in Step S162. If the result of the decision in Step S158 is No, the average value $\alpha_{ave}$ calculated in Step S156 is set as a reversal frequency ratio $\alpha_B$ for the high-speed, high-load operating region (hereinafter referred to as B-region reversal frequency ratio), in Step S164, and the flag $F_A$ is set to the value "0" which indicates completion of the calculation of the B-region reversal frequency ratio $\alpha_B$, in Step S166. After the value of the flag $F_A$ is set to "0" or "1", the subroutine is ended.

If, on the other hand, the result of the decision in Step S144 becomes No during execution of the reversal frequency ratio calculation subroutine, the ECU 40 resets the total $\alpha_{total(n)}$ of the reversal frequency ratio $\alpha$ and the number of additions n individually to "0", in Step S168, and resumes the process after resetting the count value T of the timer to "0" in Step S170. Namely, in the event the engine operating state shifts between the low-speed, low-load operating region and the high-speed, high-load operating region before the predetermined time $T_A$ elapses from the start of the reversal frequency ratio calculation subroutine, the process of reversal frequency ratio calculation performed till then is immediately canceled. This is because if the average value $\alpha_{ave}$ of the reversal frequency ratio $\alpha$ is calculated based on reversal frequency data sampled during a very short period of time, the adverse influence of erroneous detection due to noise or the like can increase.

After Step S170 is executed, the control flow proceeds to Step S146 and starts a new reversal frequency ratio calculation process.

Upon completion of the aforementioned reversal frequency ratio calculation subroutine (Step S106 in FIG. 12), the control flow proceeds to Step S108 of the catalyst deterioration diagnosis subroutine. In Step S108, the ECU 40 determines whether or not the value of the flag $F_A$ equals "1". If the result of this decision is Yes, the A-region reversal frequency ratio $\alpha_A$ obtained in the subroutine of Step S106 is added to an accumulated value $\alpha_{Aaccu}$ of the A-region reversal frequency ratio $\alpha_A$ (hereinafter referred to as A-region accumulated value) calculated up to the preceding cycle to obtain an A-region accumulated value $\alpha_{Aaccu}$ up to the present cycle (see the equation below), in Step S110, and the value "1" is added to the number $N_A$ of accumulations of the A-region reversal frequency ratio $\alpha_A$ (hereinafter referred to as A-region accumulation frequency) up to the preceding cycle to obtain an A-region accumulation frequency up to the present cycle, in Step S112.

$$\alpha_{Aaccu} = \alpha_{Aaccu} + \alpha_A$$

If the result of the decision in Step S108 is No, a B-region accumulated value $\alpha_{Baccu}$ is calculated according to the equation below, in Step S114, and then "1" is added to B-region accumulation frequency $N_B$, in Step S116.

$$\alpha_{Baccu} = \alpha_{Baccu} + \alpha_B$$

The A- and B-region accumulated values $\alpha_{Aaccu}$ and $\alpha_{Baccu}$ and the A- and B-region accumulation frequencies $N_A$ and $N_B$ are data retained by nonvolatile RAM, and are each set to an initial value of "0" when the vehicle is shipped. These data are not initialized externally even in the case where the catalyst deterioration is continuously diagnosed for a long period of time, unless a multiuse tester is used at the time of maintenance, for example.

Upon completion of the calculation of the A- or B-region accumulated value $\alpha_{Aaccu}$ or $\alpha_{Baccu}$, the ECU 40 determines in Step S118 whether the A-region accumulation frequency $N_A$ takes a value greater than or equal to a predetermined value $N_{AX}$ (in this embodiment, 10), and if the result of this decision is No, the ECU 40 again executes Step S102 and the following steps. Consequently, the A- or B-region accumulated value $\alpha_{Aaccu}$ or $\alpha_{Baccu}$ is updated.

If the result of the decision in Step S118 becomes Yes, the ECU 40 determines in Step S120 whether the B-region accumulation frequency $N_B$ takes a value greater than or equal to a predetermined value $N_{BX}$ (in this embodiment, 10), and if the result of this decision is No, the ECU 40 repeats the execution of Step S102 and the following steps.

If the results of the decisions in Steps S118 and S120 both become Yes thereafter, the ECU 40 calculates, as a quantity of catalyst deterioration information, an average value $\alpha_{ABave}$ of the reversal frequency ratios of the whole engine operating region according to the equation below, in Step S122.

$$\alpha_{ABave} = 0.5 \times (\alpha_{Aaccu}/N_A + \alpha_{Baccu}/N_B)$$

Subsequently, the ECU 40 determines in Step S124 whether the whole-region average $\alpha_{ABave}$ takes a value greater than or equal to a predetermined discriminating threshold $T_{Hc}$ (e.g., 0.8), and if the result of this decision is No, that is, if the three-way catalyst 13 is functioning normally with a purification efficiency $E_{CAT}$ higher than or equal to a lower limit value $E_1$ (e.g., about 85%; see FIG. 8), it is judged that the three-way catalyst 13 is not deteriorated. In this case, a subroutine for normal process is executed in Step S126.

In this subroutine, Steps S32 and S34 in the subroutine for normal process shown in FIG. 5 are sequentially executed. Specifically, the warning lamp 41 is turned off to thereby inform the driver that the three-way catalyst 13 is functioning normally, and then a fault code indicative of deterioration of the three-way catalyst 13 is deleted.

On the other hand, if the whole-region average value $\alpha_{ABave}$ is greater than or equal to the discriminating threshold $T_{Hc}$ and thus the result of the decision in Step S124 is Yes, it is judged that the three-way catalyst 13 has deteriorated and its purification efficiency $E_{CAT}$ has become lower than the lower limit value $E_1$. In this case, a subroutine for deterioration process is executed in Step S128.

In this subroutine for deterioration process, Steps S42 and S44 of the subroutine shown in FIG. 6 are executed. Specifically, the warning lamp 41 is lit up to thereby inform the driver of the deterioration of the three-way catalyst 13 and thus the need for repair, and then a fault code indicative of deterioration of the three-way catalyst 13 is written into nonvolatile RAM.

Upon completion of the subroutine for normal or deterioration process, the ECU 40 resets all of the A- and B-region accumulated values $\alpha_{Aaccu}$ and $\alpha_{Baccu}$ and A- and B-region accumulation frequencies $N_A$ and $N_B$ to "0", in Step S130. Subsequently, the ECU 40 restarts the execution of the catalyst deterioration diagnosis subroutine.

Since the procedure described above is employed in this embodiment to diagnose deterioration of the three-way catalyst, the whole-region average value $\alpha_{ABave}$ reflects an average of the calculations for both A and B regions. Accordingly, even in the case where a specific operating state occurs outstandingly and thus the frequency of calculations of the reversal frequency ratio $\alpha$ is biased to the A or B region, deterioration of the three-way catalyst can be determined with accuracy, permitting repair or replacement of the three-way catalyst to be performed at an appropriate time.

The foregoing is the description of the embodiments according to the present invention. It is to be noted, however, that the present invention is not limited to the first and second embodiments described above.

For example, although in the first and second embodiments, the determination as to deterioration of the three-way catalyst is suspended only when the upstream-side $O_2$ sensor is deteriorated, similar measures may be taken also when the downstream-side $O_2$ sensor is deteriorated. Further, in these embodiments, a voltage output-type $O_2$ sensor is used for each of the upstream- and downstream-side air-fuel ratio sensors, but a current output-type sensor such as a linear air-fuel ratio sensor may alternatively be used. Also, the specific procedures for diagnosing deterioration of the catalyst, the specific threshold values, etc. may be suitably changed. In the foregoing embodiments, the average value of the sensor output signal up to the present cycle is obtained based on the average value of the sensor output signal up to the preceding cycle and the sensor output signal of the present cycle, but the average value may alternatively be obtained based on plural values of the sensor output signal derived up to the present cycle. Also, it is not essential to variably set the reversal reference values, which are used for detecting the reversal frequencies of the sensor outputs, in accordance with the average value of the sensor output signal. Alternatively, the reversal reference values may be variably set in accordance with a representative sensor output signal value indicating the average sensor output.

Furthermore, in the second embodiment, the whole engine operating region is divided into two regions and the accumulated value of the reversal frequency ratio is obtained for each of the two engine operating regions. Alternatively, the accumulated value of the reversal frequency ratio may be obtained for each of three or more subdivided engine operating regions. Also, the engine operating region may be subdivided based solely on engine load information such as intake air amount information etc. Further, in the second embodiment, when the reversal frequency ratios $\alpha_A$ and $\alpha_B$ associated with the respective two engine operating regions have been accumulated the respective predetermined numbers of times $N_{AX}$ and $N_{BX}$ or more, the average value of the reversal frequency ratios of the whole engine operating region is calculated as the quantity of catalyst deterioration information, on the basis of the accumulated values of the reversal frequency ratios $\alpha_A$ and $\alpha_B$. Alternatively, when the reversal frequency ratio associated with one of the engine operating regions has been accumulated the predetermined number of times, the average value of the reversal frequency ratio of this engine operating region may be calculated as the catalyst deterioration information quantity on the basis of the accumulated value of the reversal frequency ratio concerned. The catalyst deterioration information quantity thus calculated is compared with a discriminating threshold to thereby make a determination as to deterioration of the catalyst. In this case, the discriminating threshold is preferably set for each of the engine operating regions.

What is claimed is:

1. An apparatus for making a deterioration diagnosis of an exhaust purifying catalyst, comprising:

a downstream-side air-fuel ratio sensor arranged in an exhaust passage of an internal combustion engine on a downstream side of the exhaust purifying catalyst;

reference value setting means for variably setting a reversal reference value in accordance with an output signal of said downstream-side air-fuel ratio sensor; and deterioration determining means for determining presence of deterioration of the exhaust purifying catalyst, based on a number of times the output signal of said downstream-side air-fuel ratio sensor has crossed the reversal reference value set by said reference value setting means.

2. The apparatus according to claim 1, wherein said reference value setting means includes an average value computing means for calculating an average value of input values of the output signal of said downstream-side air-fuel ratio sensor, and variably sets the reversal reference value in accordance with the average value calculated by said average value computing means.

3. The apparatus according to claim 2, wherein said average value computing means calculates the average value of input values of the output signal of said downstream-side air-fuel ratio sensor according to the equation $$O_{2ave}=a \times O_{2ave(n-1)}+(1-a) \times O_{2real}$$

where $O_{2ave}$ is the average value of input values of the output signal of said downstream-side air-fuel ratio sensor, $O_{2ave(n-1)}$ is an average value calculated in a preceding cycle, $O_{2real}$ is an input value of a present output signal of said downstream-side air-fuel ratio sensor, and a is a filter constant.

4. The apparatus according to claim 1, wherein said deterioration determining means includes first reversal frequency detecting means for detecting a frequency of reversals of a changing direction in which the output signal of said downstream-side air-fuel ratio sensor changes, based on the number of times the output signal of said downstream-side air-fuel ratio sensor has crossed the reversal reference value set by said reference value setting means, and wherein said deterioration determining means determines deterioration of the exhaust purifying catalyst based on the reversal frequency associated with the output signal of said downstream-side air-fuel ratio sensor detected by said first reversal frequency detecting means.

5. The apparatus according to claim 4, further comprising:

an upstream-side air-fuel ratio sensor arranged in the exhaust passage on an upstream side of the exhaust purifying catalyst, wherein said deterioration determining means includes second reversal frequency detecting means for detecting a frequency of reversals of a changing direction in which an output signal of said upstream-side air-fuel ratio sensor changes, and deterioration information quantity computing means for computing a quantity of catalyst deterioration information based on the reversal frequency of the changing direction of the output signal of said downstream-side air-fuel ratio sensor, which frequency is detected by said first reversal frequency detecting means, and the reversal frequency of the changing direction of the output signal of said upstream-side air-fuel ratio sensor, which frequency is detected by said second reversal frequency detecting means, and wherein said deterioration determining means determines deterioration of the exhaust purifying catalyst based on the catalyst deterioration information quantity computed by said deterioration information quantity computing means.

6. The apparatus according to claim 5, further comprising:

operating state detecting means for detecting an operating state of the internal combustion engine; and operating region determining means for determining to which of preset plural operating regions the operating state detected by said operating state detecting means belongs, wherein said deterioration information quantity computing means sequentially computes catalyst deterioration information quantities for at least two operating regions sequentially determined by said operating region determining means, and wherein said deterioration determining means determines deterioration of the exhaust purifying catalyst based on the catalyst deterioration information quantities computed by said deterioration information quantity computing means for said at least two operating regions, respectively.

7. The apparatus according to claim 5, further comprising:

operating state detecting means for detecting an operating state of the internal combustion engine; and operating region determining means for determining to which of preset plural operating regions the operating state detected by said operating state detecting means belongs, wherein said deterioration information quantity computing means computes a catalyst deterioration information quantity with respect to the operating region determined by said operating region determining means, and wherein said deterioration determining means determines deterioration of the exhaust purifying catalyst based on the catalyst deterioration information quantity computed by said deterioration information quantity computing means with respect to the operating region determined by said operating region determining means, and a predetermined discriminating value associated with the operating region determined by said operating region determining means.

8. The apparatus according to claim 5, which is used with an internal combustion engine having air-fuel ratio control means for feedback-controlling the air-fuel ratio of a mixture supplied to the internal combustion engine such that the output signal of said upstream-side air-fuel ratio sensor repeatedly crosses a threshold value corresponding to a predetermined target air-fuel ratio, to cause the changing direction of the output signal to repeatedly reverse.

9. The apparatus according to claim 8, which is used with a three-way catalyst as the exhaust purifying catalyst, and wherein said air-fuel ratio control means controls the air-fuel ratio of the mixture to or near a stoichiometric air-fuel ratio.

10. The apparatus according to claim 5, wherein said deterioration information quantity computing means computes a ratio of the reversal frequency of the output signal of said downstream-side air-fuel ratio sensor detected by said first reversal frequency detecting means, to the reversal frequency of the output signal of said upstream-side air-fuel ratio sensor detected by said second reversal frequency detecting means, and computes the catalyst deterioration information quantity based on the reversal frequency ratio thus computed.

11. The apparatus according to claim 10, wherein said deterioration information quantity computing means repeatedly computes the reversal frequency ratio, obtains an average value of the computed values of the reversal frequency ratio computed during a predetermined time, and computes the catalyst deterioration information quantity based on the average value.

12. The apparatus according to claim 11, wherein said deterioration information quantity computing means sequentially accumulates the average value while repeatedly obtaining the average value of computed values of the reversal frequency ratio, and computes the catalyst deterioration information quantity based on a value obtained by dividing a final accumulated value by a number of times the accumulation of the average values has been repeated.

13. The apparatus according to claim 12, wherein said deterioration determining means obtains the final accumulated value of average values of the reversal frequency ratio for each of said at least two operating regions when the number of accumulations of the computed reversal frequency ratio has become greater than a corresponding one of predetermined numbers set in advance for the respective operating regions.

14. The apparatus according to claim 5, wherein said deterioration information quantity computing means sequentially accumulates the computed catalyst deterioration information quantity while repeatedly calculating the catalyst deterioration information quantity for the operating region determined by said operating region determining means, and wherein said deterioration determining means determines deterioration of the exhaust purifying catalyst when the number of accumulations of the calculated catalyst deterioration information quantity, accumulated by said deterioration information quantity computing means for each of operating regions, has become greater than a corresponding one of predetermined numbers set in advance for the respective operating regions.

15. The apparatus according to claim 6, wherein the plural operating regions are set based at least on information about load of the internal combustion engine.

16. The apparatus according to claim 7, wherein the plural operating regions are set based at least on information about load of the internal combustion engine.

17. The apparatus according to claim 6, wherein the plural operating regions include at least a high-speed, high-load operating region and a low-speed, low-load operating region.

18. The apparatus according to claim 7, wherein the plural operating regions include at least a high-speed, high-load operating region and a low-speed, low-load operating region.

19. The apparatus according to claim 11, wherein said deterioration information quantity computing means suspends the computation of the catalyst deterioration information quantity when the operating state of the internal combustion engine shifts between the plural operating regions during the predetermined time.

* * * * *